United States Patent
Hayashi et al.

(10) Patent No.: US 12,311,984 B2
(45) Date of Patent: May 27, 2025

(54) REMOTE SUPPORT SYSTEM AND REMOTE SUPPORT METHOD

(71) Applicant: TOYOTA JIDOSHA KABUSHIKI KAISHA, Toyota (JP)

(72) Inventors: Yusuke Hayashi, Susono (JP); Taichi Kawanai, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 502 days.

(21) Appl. No.: 17/677,014

(22) Filed: Feb. 22, 2022

(65) Prior Publication Data

US 2022/0266871 A1 Aug. 25, 2022

(30) Foreign Application Priority Data

Feb. 24, 2021 (JP) ................. 2021-027861

(51) Int. Cl.
*B60W 60/00* (2020.01)
*B60W 30/09* (2012.01)
(Continued)

(52) U.S. Cl.
CPC ........ *B60W 60/0059* (2020.02); *B60W 30/09* (2013.01); *B60W 30/0956* (2013.01); *B60W 40/04* (2013.01); *B60W 50/0097* (2013.01); *B60W 60/0015* (2020.02); *B60W 60/00272* (2020.02); *B60W 60/0057* (2020.02);
(Continued)

(58) Field of Classification Search
None
See application file for complete search history.

(56) References Cited

U.S. PATENT DOCUMENTS 9,008,890 B1 * 4/2015 Herbach .............. G05D 1/0297
340/436
9,494,935 B2   11/2016 Okumura et al.
(Continued)

FOREIGN PATENT DOCUMENTS

CA       3069730 A1 *   1/2019   ............ B60W 30/00
JP       2017-147626 A   8/2017
(Continued)

OTHER PUBLICATIONS

Non-Final Office Action dated Sep. 26, 2023, Issued to U.S. Appl. No. 17/677,507, filed Feb. 22, 2022.
(Continued)

*Primary Examiner* — Aniss Chad
*Assistant Examiner* — Jennifer M Anda
(74) *Attorney, Agent, or Firm* — Dinsmore & Shohl LLP

(57) ABSTRACT

A remote support system is configured to determine whether a vehicle collides with an object to be avoided when the vehicle gets into a remote control request situation, stop to send a remote control request when the remote support system determines that the vehicle does not collide with the object, generate a first speed plan for the vehicle to continue autonomous driving at a predicted collision position and a second speed plan for the vehicle to stop before reaching the predicted collision position when the remote support system determines that the vehicle collides with the object, and determine to send a remote control request based on the degree of deviation between these speed plans.

12 Claims, 21 Drawing Sheets

(51) Int. Cl.
  *B60W 30/095* (2012.01)
  *B60W 40/04* (2006.01)
  *B60W 50/00* (2006.01)
(52) U.S. Cl.
  CPC ..... *B60W 60/0061* (2020.02); *B60W 2554/80* (2020.02); *B60W 2556/40* (2020.02); *B60W 2556/50* (2020.02)

(56) References Cited

U.S. PATENT DOCUMENTS

| | | | |
|---|---|---|---|
| 10,604,152 | B2 | 3/2020 | Burford et al. |
| 11,150,652 | B2 | 10/2021 | Schmitt et al. |
| 11,787,438 | B2 | 10/2023 | Houshmand et al. |
| 11,919,540 | B2* | 3/2024 | Hayashi ............ G08G 1/096822 |
| 2015/0046058 | A1* | 2/2015 | Nagata ................. B60W 30/09 701/93 |
| 2015/0248131 | A1* | 9/2015 | Fairfield .............. G05D 1/0027 701/2 |
| 2017/0334442 | A1 | 11/2017 | Sakai et al. |
| 2017/0371338 | A1 | 12/2017 | Kamata et al. |
| 2018/0037262 | A1* | 2/2018 | Imai ..................... G05D 1/0055 |
| 2018/0196437 | A1 | 7/2018 | Herbach et al. |
| 2019/0139415 | A1* | 5/2019 | Sakaguchi ............ B60W 30/10 |
| 2019/0354111 | A1* | 11/2019 | Cheng .................. G05D 1/0011 |
| 2020/0033845 | A1 | 1/2020 | Park |
| 2020/0111366 | A1 | 4/2020 | Nanri et al. |
| 2020/0211394 | A1* | 7/2020 | King .................... B60W 50/023 |
| 2020/0341470 | A1* | 10/2020 | Maeda ............... G01C 21/3822 |
| 2020/0409368 | A1 | 12/2020 | Caldwell et al. |
| 2021/0012662 | A1* | 1/2021 | Sun ..................... B60W 50/085 |
| 2021/0072744 | A1* | 3/2021 | Urano ............... B60W 60/0027 |
| 2021/0206368 | A1 | 7/2021 | Tsuruoka et al. |
| 2022/0066440 | A1 | 3/2022 | Sucan et al. |
| 2022/0105959 | A1* | 4/2022 | Hartnett ........... B60W 60/0027 |

FOREIGN PATENT DOCUMENTS

| | | |
|---|---|---|
| JP | 2018-077649 A | 5/2018 |
| KR | 10-2019-0106846 A | 9/2019 |
| WO | 2013-136492 A1 | 9/2013 |

OTHER PUBLICATIONS

U.S. Appl. No. 17/676,998, filed Feb. 22, 2022; Inventors: Yusuke Hayashi et al.
U.S. Appl. No. 17/677,507, filed Feb. 22, 2022; Inventors: Yusuke Hayashi et al.
Notice of Allowance dated Dec. 28, 2023, Issued to U.S. Appl. No. 17/677,507, filed Feb. 22, 2022.
Office Action dated Jul. 15, 2024 pertaining to U.S. Appl. No. 17/676,998, filed Feb. 22, 2022, 43 pages.
US Office Action dated Mar. 13, 2024, issued to U.S. Appl. No. 17/676,998, 63 pages.

\* cited by examiner

REMOTE SUPPORT SYSTEM AND REMOTE SUPPORT METHOD

CROSS-REFERENCE TO RELATED APPLICATION

This application claims priority to Japanese Patent Application No. 2021-027861 filed on Feb. 24, 2021, incorporated herein by reference in its entirety.

BACKGROUND

1. Technical Field

The present disclosure relates to remote support systems and remote support methods for sending a remote control request for a vehicle to a remote operator.

2. Description of Related Art

Japanese Unexamined Patent Application Publication No. 2018-77649 (JP 2018-77649 A) discloses a technique relating to a remote control device for causing a remote operator to perform remote control of a vehicle. In this device, the remote operator remotely controls the vehicle in response to a remote control request received from the vehicle that travels autonomously.

SUMMARY

In the technique of JP 2018-77649 A, a remote control request is sent in response to a vehicle occupant performing a button operation etc. to request remote control. If such a remote control request is sent frequently, the burden on the remote operator increases. However, it is not easy to reduce the frequency at which a remote control request is sent while ensuring the safety of the vehicle during autonomous driving.

The present disclosure provides a remote support system and a remote support method that can reduce the burden on a remote operator by reducing the frequency at which an autonomous vehicle sends a remote control request.

A first aspect of the present disclosure is a remote support system configured to send a remote control request to a remote operator when a vehicle traveling autonomously gets into a remote control request situation. The remote support system includes: a storage device storing at least one program; and at least one processor connected to the at least one storage device. The at least one processor is configured to perform a first determination process and a second determination process by executing the at least one program when the vehicle gets into the remote control request situation. The first determination process is a process of determining whether the vehicle collides with an object to be avoided regarding the remote control request situation. The second determination process is a process of determining necessity of sending the remote control request based on the result of the first determination process. The first determination process has: acquiring at least one of map information around the vehicle, surrounding environment information regarding a surrounding environment of the vehicle, and vehicle motion information regarding motion of the vehicle; and determining whether the vehicle collides with the object to be avoided, based on at least one of the map information, the vehicle motion information, and the surrounding environment information. The second determination process has stopping to send the remote control request when the at least one processor determines that the vehicle does not collide with the object to be avoided in the first determination process.

According to the first aspect, even when the vehicle gets into the remote control request situation, the remote control request is not sent when the at least one processor determines that the vehicle does not collide with the object to be avoided. According to such a configuration, the frequency at which the remote control request is sent can be reduced while ensuring the safety of the vehicle. This reduces the burden on the remote operator.

In the first aspect, the first determination process may have: generating a future predicted trajectory of the object to be avoided, based on the map information or the surrounding environment information; generating a future travel trajectory of the vehicle based on at least one of the map information, the vehicle motion information, and the surrounding environment information; calculating a predicted collision position where the vehicle collides the object to be avoided, based on the predicted trajectory and the travel trajectory; and determining whether the vehicle collides with the object to be avoided, based on the map information or the surrounding environment information at the predicted collision position.

In the first aspect, the first determination process may have determining that the vehicle does not collide with the object to be avoided, when the vehicle is in a traffic environment in which the vehicle has priority over the object to be avoided at the predicted collision position.

In the first aspect, the first determination process may have determining that the vehicle does not collides with the object to be avoided, when the object to be avoided is a vehicle in front of the vehicle at the predicted collision position.

In the first aspect, the first determination process may have determining that the vehicle collides with the object to be avoided, when the vehicle is in a traffic environment in which the object to be avoided has priority over the vehicle at the predicted collision position.

According to the above configuration, the at least one processor determines whether the vehicle collides with the object to be avoided, based on the map information or surrounding environment information at the calculated predicted collision position. According to such a configuration, it is possible to make a highly accurate collision determination according to the traffic environment or surrounding environment at the predicted collision position.

In the first aspect, the at least one processor may be configured to continue autonomous driving of the vehicle based on the travel trajectory, when the at least one processor determines that the vehicle does not collide with the object to be avoided in the first determination process by executing the at least one program.

According to the above configuration, even when the vehicle gets into the remote control request situation, autonomous driving of the vehicle is continued based on the travel trajectory when the at least one processor determines that the vehicle does not collide with the object to be avoided. According to such a configuration, it is possible to prevent an occupant of the vehicle from feeling uncomfortable or prevent occupants of surrounding vehicles from feeling something is wrong due to a change in behavior of the vehicle in preparation to send a remote control request.

In the first aspect, when the at least one processor determines in the first determination process that the vehicle collides with the object to be avoided, the second determination process may have generating a first speed plan for the vehicle to continue autonomous driving at the predicted collision position; generating a second speed plan for the vehicle to stop before the vehicle reaches the predicted collision position; and determining whether to send the remote control request, based on a degree of deviation between the first speed plan and the second speed plan.

According to the above configuration, the at least one processor generates the first speed plan that is a speed plan for when the vehicle continues autonomous driving and the second speed plan that is a speed plan for the vehicle to stop before reaching the predicted collision position. The degree of deviation between the first speed plan and the second speed plan is an index for determining the degree of deviation in speed between when the vehicle continues autonomous driving and when the vehicle stops. Therefore, according to such a configuration, it is possible to determine the limit of the timing at which the remote control request should be sent.

In the first aspect, the second determination process may have: calculating remaining time until a speed difference between the first speed plan and the second speed plan becomes a predetermined threshold; and determining to send the remote control request, based on a condition that the remaining time is longer than determination time predetermined as determination time for the remote operator.

According to the above configuration, by considering the determination time for the remote operator, the remote control request can be sent so that remote control is started before the speed difference between the first speed plan and the second speed plan becomes the predetermined threshold.

In the first aspect, the at least one processor may be configured to continue autonomous driving of the vehicle based on the first speed plan, when the at least one processor determines not to send the remote control request in the second determination process by executing the at least one program.

According to the above configuration, autonomous driving of the vehicle is performed based on the first speed plan when the at least one processor determines not to send the remote control request. According to such a configuration, while the remote control request is not being sent, the vehicle is driven according to the speed plan generated on the assumption that automatic driving is continued. This prevents the traffic flow from being disturbed.

In the first aspect, the at least one processor may be configured to continue autonomous driving of the vehicle based on the second speed plan, when the at least one processor determines to send the remote control request in the second determination process by executing the at least one program.

According to the above configuration, autonomous driving of the vehicle is performed based on the second speed plan when the at least one processor determines to send the remote control request. According to such a configuration, it is possible to shift the vehicle to the moving state suitable for starting remote control by the remote operator.

A second aspect of the present disclosure is a remote support method in which a remote control request is sent to a remote operator when a vehicle traveling autonomously gets into a remote control request situation. The remote support method has: when the vehicle gets into the remote control request situation, performing a first determination process by a processor that executes at least one program, the first determination process being a process of determining whether the vehicle collides with an object to be avoided regarding the remote control request situation; and when the vehicle gets into the remote control request situation, performing a second determination process by the processor that executes the at least one program, the second determination process being a process of determining necessity of sending the remote control request based on the result of the first determination process. The first determination process has: acquiring at least one of information: map information around the vehicle, surrounding environment information regarding a surrounding environment of the vehicle, and vehicle motion information regarding motion of the vehicle; and determining whether the vehicle collides with the object to be avoided, based on at least one of the map information, the vehicle motion information, and the surrounding environment information. The second determination process has stopping to send the remote control request when the processor determines that the vehicle is does not collide with the object to be avoided in the first determination process.

According to the second aspect, even when the vehicle gets into the remote control request situation, the remote control request is not sent when the processor determines that the vehicle does not collide with the object to be avoided. According to such a configuration, the frequency at which the remote control request is sent can be reduced while ensuring the safety of the vehicle. This reduces the burden on the remote operator.

In the second aspect, the first determination process may have: generating a future predicted trajectory of the object to be avoided, based on the map information or the surrounding environment information; generating a future travel trajectory of the vehicle based on at least one of the map information, the vehicle motion information, and the surrounding environment information; calculating a predicted collision position where the vehicle collides the object to be avoided, based on the predicted trajectory and the travel trajectory; and determining whether the vehicle collides with the object to be avoided, based on the map information or the surrounding environment information at the predicted collision position. When the processor determines that the vehicle collides with the object to be avoided in the first determination process. By the processor, the second determination process may have generating a first speed plan for the vehicle to continue autonomous driving at the predicted collision position, generating a second speed plan for the vehicle to stop before the vehicle reaches the predicted collision position, and determining to send the remote control request, based on the first speed plan and the second speed plan.

According to the above configuration, the processor generates the first speed plan that is a speed plan for when the vehicle continues autonomous driving and the second speed plan that is a speed plan for the vehicle to stop before reaching the predicted collision position. The degree of deviation between the first speed plan and the second speed plan is an index for determining the degree of deviation in speed between when the vehicle continues autonomous driving and when the vehicle stops. Therefore, according to such a configuration, it is possible to determine the limit of the timing at which the remote control request should be sent.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings. Numerical values for each element that are mentioned in the following embodiments, such as the number, quantity, amount, and range of each element, are not intended to limit the disclosure to the mentioned numerical values unless otherwise specified or unless it is theoretically obvious that the disclosure is limited to the mentioned numerical values. Structures, steps, etc. that are described in the following embodiments are not necessary to the disclosure unless otherwise specified.

First Embodiment

1-1. Overall Configuration of Remote Support System of First Embodiment

Figure 1:
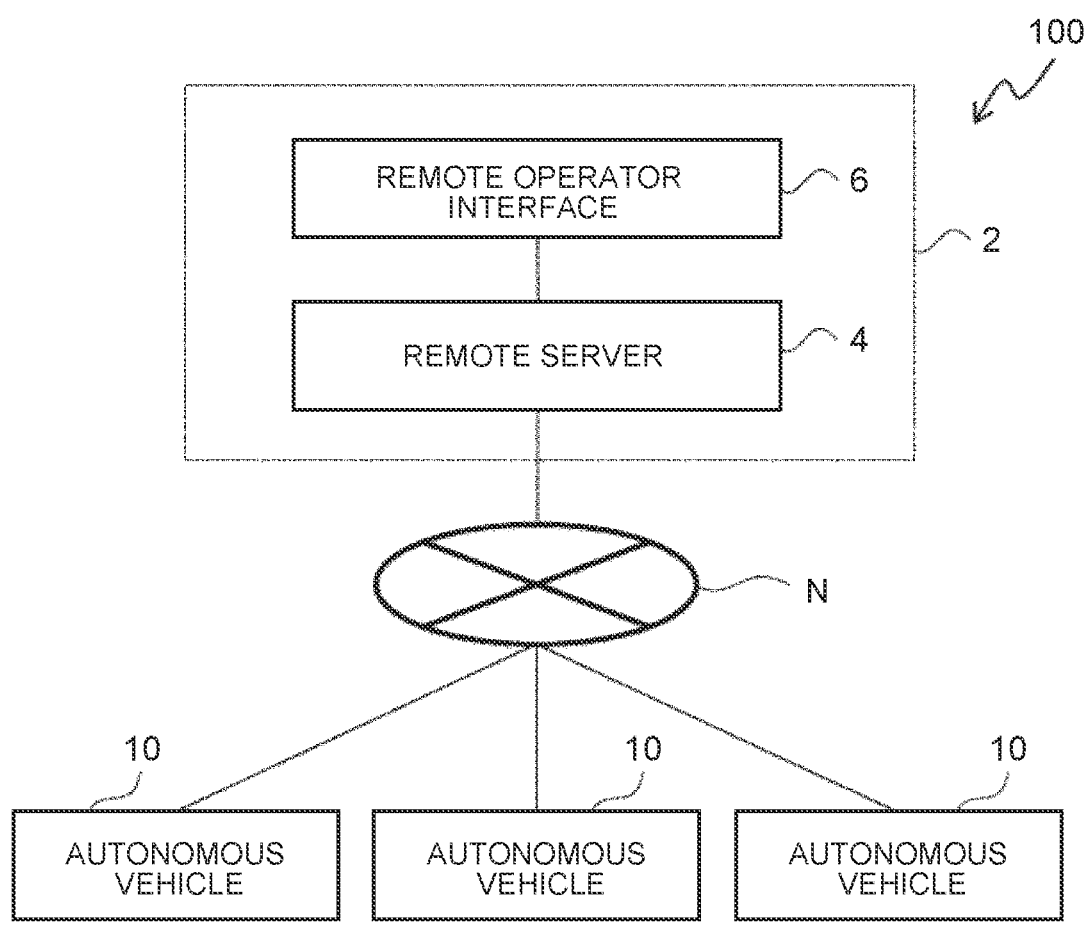
FIG. 1 is a block diagram showing a configuration example illustrating an overview of a remote support system according to a first embodiment.

First, a schematic configuration of a remote support system of a first embodiment will be described. FIG. 1 is a block diagram showing a configuration example illustrating an overview of the remove support system of the first embodiment. A remote support system 100 shown in FIG. 1 is a system that performs on an autonomous vehicle 10 remote control for controlling traveling of the autonomous vehicle 10. Hereinafter, the autonomous vehicle 10 that is used in the remote support system 100 is sometimes simply referred to as the "vehicle 10."

Remote control includes not only remote control including operation commands for any of acceleration, deceleration, and steering of the vehicle, but also driver assistance for assisting a part of perception or determination of the surrounding environment of the vehicle 10. Remote control is performed by a remote operator who stands by at a remote location. The number of remote operators who are used in the remote support system 100 is not limited. The number of vehicles 10 that are used in the remote support system 100 is not limited, either.

As shown in FIG. 1, the remote support system 100 includes the vehicles 10 and a remote control device 2. The remote control device 2 includes a remote server 4 and a remote operator interface 6 for the remote operator to perform input operations for remote control. The remote server 4 is connected to the vehicles 10 via a communication network N so that the remote server 4 can communicate with the vehicles 10. Various kinds of information are sent from the vehicles 10 to the remote server 4. The remote operator interface 6 includes, for example, an input device simulating a steering wheel, an accelerator pedal, and a brake pedal of a vehicle. Alternatively, the remote operator interface 6 includes an input device for inputting determination results in driver assistance.

In the remote support system 100, the remote operator performs remote control via the remote control device 2 in response to a remote control request sent from the vehicle 10. Typically, the remote operator performs input operations for remote control to the remote operator interface 6. The remote server 4 sends remote control commands to the vehicle 10 via the communication network N. The vehicle 10 travels according to the remote control commands sent from the remote control device 2. Since related art can be used for the configuration of the remote control device 2, detailed description of the configuration of the remote control device 2 will be omitted.

1-2. Configuration of Autonomous Vehicle of First Embodiment

Figure 2:
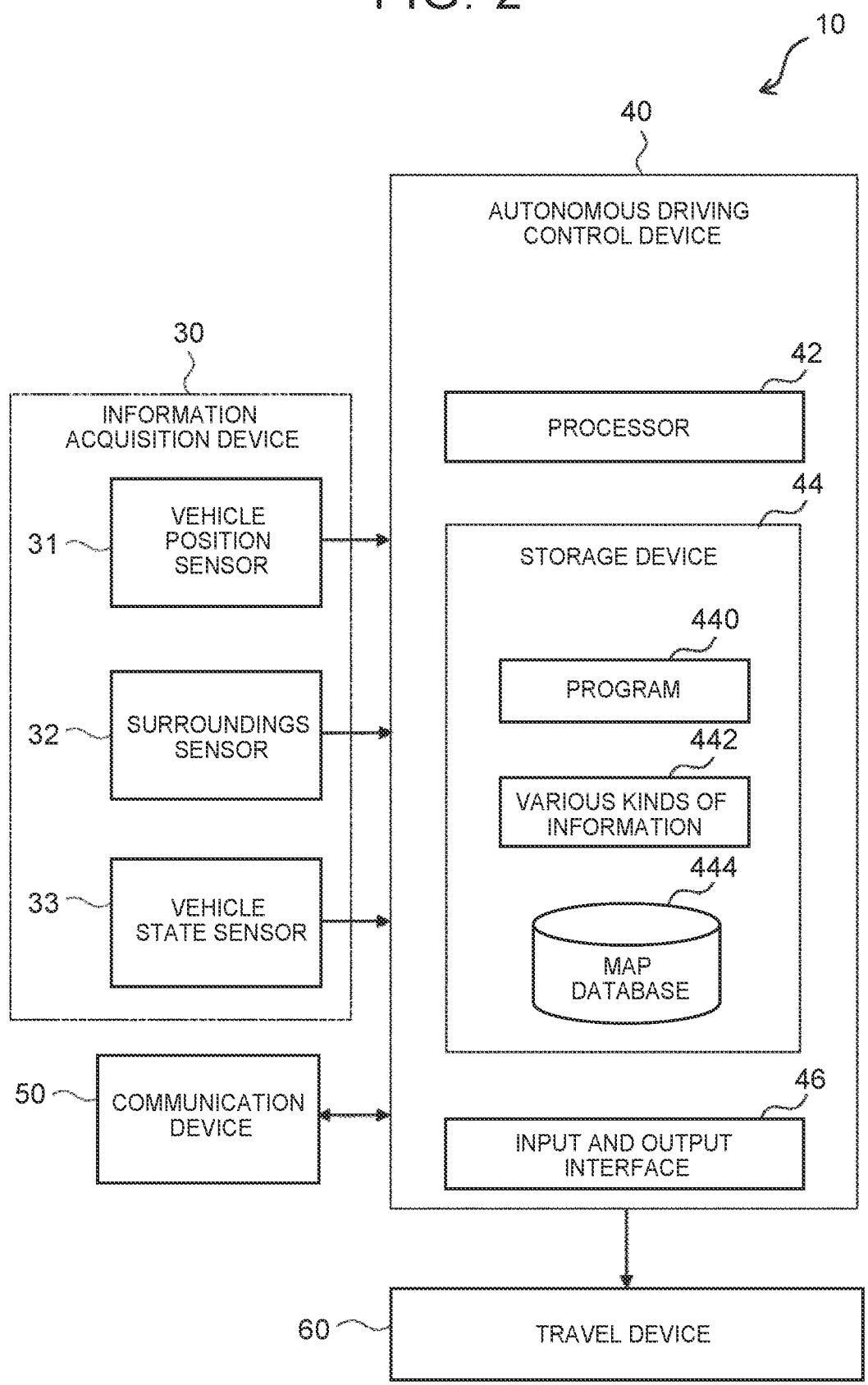
FIG. 2 is a block diagram showing an example of the configuration of an autonomous vehicle.

Next, an example of the configuration for autonomous driving of the autonomous vehicle 10 that is applied to the remote support system 100 of the first embodiment will be described. FIG. 2 is a block diagram showing an example of the configuration of the autonomous vehicle 10. The vehicle 10 is an autonomous vehicle capable of autonomous driving. Regarding autonomous driving, it is herein assumed that the vehicle 10 drives at Level 3 or higher of driving automation defined by the Society of Automotive Engineers (SAE). The power source of the vehicle 10 is not limited.

The vehicle 10 includes an autonomous driving control device 40. The autonomous driving control device 40 has a function to perform autonomous driving of the vehicle 10 and a function to perform remote autonomous driving of the vehicle 10 according to remote control commands sent from the remote operator. An information acquisition device 30, a communication device 50, and a travel device 60 are connected to the autonomous driving control device 40.

The information acquisition device 30 includes a vehicle position sensor 31, a surroundings sensor 32, and a vehicle state sensor 33.

The vehicle position sensor 31 detects the position and orientation of the vehicle 10. For example, the vehicle position sensor 31 includes a Global Positioning System (GPS) sensor. The GPS sensor receives signals sent from a plurality of GPS satellites and calculates the position and orientation of the vehicle 10 based on the received signals. The vehicle position sensor 31 may perform localization to increase the accuracy of the current position of the vehicle 10. The information detected by the vehicle position sensor 31 is sent to the autonomous driving control device 40 as necessary as a part of surrounding environment information.

The surroundings sensor 32 perceives surroundings information of the vehicle 10. Examples of the surroundings sensor 32 include a camera (imaging device), a laser imaging detection and ranging (LIDAR), and a radar. The surroundings information includes landmark information perceived by the surroundings sensor 32. Examples of a landmark include surrounding vehicles, pedestrians, roadside objects, obstacles, white lines, and traffic lights. The landmark information includes the position and speed of the landmark relative to the vehicle 10. The information perceived by the surroundings sensor 32 is sent to the autonomous driving control device 40 as necessary as a part of the surrounding environment information.

The vehicle state sensor 33 detects vehicle information indicating the state of the vehicle 10. Examples of the vehicle state sensor 33 include a vehicle speed sensor, a lateral acceleration sensor, and a yaw rate sensor. The information detected by the vehicle state sensor 33 is sent to the autonomous driving control device 40 as necessary as a part of vehicle motion information.

The communication device 50 communicates with the vehicle 10 and the outside. For example, the communication device 50 sends and receives various kinds of information to and from the remote control device 2 via the communication network N. The communication device 50 also communicates with external devices such as roadside units, surrounding vehicles, and surrounding infrastructure. The roadside unit is a beacon device that sends, for example, traffic congestion information, traffic information for each lane, regulation information such as stop, and information on traffic conditions in blind spots. When the external device is a surrounding vehicle, the communication device 50 performs vehicle-to-vehicle communications (V2V communication) with the surrounding vehicle. When the external device is surrounding infrastructure, the communication device 50 performs vehicle-to-infrastructure communication (V2I communication) with the surrounding infrastructure.

The travel device 60 includes a steering device, a drive device, and a braking device. The steering device steers wheels of the vehicle 10. The drive device is a driving source that generates a driving force for the vehicle 10. Examples of the drive device include an engine and an electric motor. The braking device generates a braking force for the vehicle 10. The travel device 60 controls traveling of the vehicle 10 based on traveling controlled variables related to steering, acceleration, and deceleration of the vehicle 10.

The autonomous driving control device 40 is an information processing device that performs various processes for autonomous driving and remote autonomous driving. Typically, the autonomous driving control device 40 is a microcomputer including at least one processor 42, at least one storage device 44, and at least one input and output interface 46. The autonomous driving control device 40 is also referred to as the electronic control unit (ECU).

Various kinds of information 442 are stored in the storage device 44. For example, the various kinds of information 442 include the surrounding environment information and vehicle motion information described above. Examples of the storage device 44 include a volatile memory, a non-volatile memory, and a hard disk drive (HDD).

The storage device 44 has a map database 444 stored therein. The map database 444 is a database that stores map information. The map information includes position information of roads, information on road shapes, numbers of lanes, lane widths, position information of intersections and branch points, and traffic environment information indicating a traffic environment such as levels of priority of roads. The map database 444 may be stored in a server capable of communicating with the vehicle 10, such as the remote server 4 of the remote control device 2.

The processor 42 includes a central processing unit (CPU). The processor 42 is coupled to the storage device 44 and the input and output interface 46. The storage device 44 has stored therein at least one program 440 for autonomous driving and remote autonomous driving. Various functions of the autonomous driving control device 40 are implemented by the processor 42 reading and executing the program 440 stored in the storage device 44.

The input and output interface 46 is an interface for sending and receiving information to and from the remote control device 2. Various kinds of information generated by the autonomous driving control device 40 and a remote control request that will be described later are output to the remote control device 2 via the input and output interface 46.

1-3. Features of Remote Support System of First Embodiment

Figure 3:
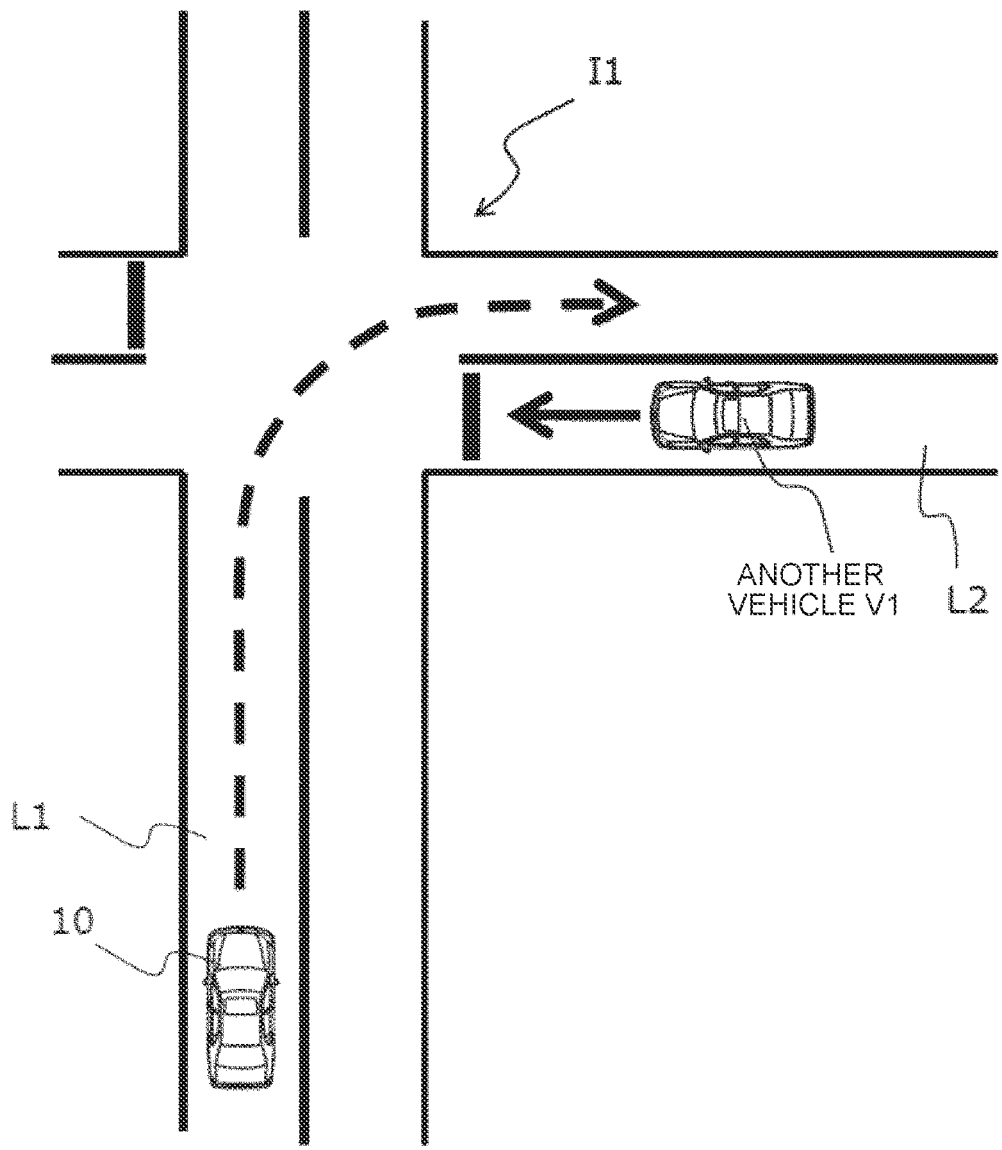
FIG. 3 illustrates an example of a situation in which remote control is performed in a remote support system of a comparative example.

First, an example of a situation in which the remote operator performs remote control in a remote support system of a comparative example will be described. FIG. 3 illustrates an example of the situation in which remote control is performed in the remote support system of the comparative example. The same elements of the remote support system of the comparative example as those of the remote support system 100 of the first embodiment are denoted by the same signs.

In the remote support system of the comparative example, the vehicle 10 sends a remote control request to the remote control device 2 when the vehicle 10 gets into a remote control request situation. The remote control request situation refers to a situation in which the vehicle 10 should send a remote control request to the remote control device 2. The remote control request situation may be set in advance so as to include a situation factor that can be determined from, for example, the map information. Typically, the remote control request situation is a situation in which the vehicle 10 passes, with a specific situation factor, through a remote control request point that can be determined from the map information. Examples of such a remote control request situation include a situation in which the vehicle 10 turns right at an intersection, a situation in which the vehicle 10 starts moving after stopping at a specific intersection, a situation in which the vehicle 10 starts changing lanes, a situation in which the vehicle 10 travels on a specific narrow road, and a situation in which the vehicle 10 passes through an intersection with a blind spot.

The traffic environment shown in FIG. 3 is an intersection I1 where a lane L1 and a lane L2 intersect. The lane L1 is a priority lane over the lane L2. A situation in which the vehicle 10 traveling in the lane L1 turns right at the intersection I1 shown in FIG. 3 has been set as the remote control request situation.

The autonomous driving control device 40 of the vehicle 10 has generated a travel plan in which the vehicle 10 turns right from the lane L1 into the lane L2 at the intersection I1. In this case, as the vehicle 10 approaches the intersection I1, the autonomous driving control device 40 determines that the vehicle 10 has gotten into the remote control request situation. The autonomous driving control device 40 sends a remote control request to the remote control device 2 and also sends various kinds of information acquired by the information acquisition device 30 as information necessary for remote control of the vehicle 10. The remote control device 2 performs remote autonomous driving by the remote operator in response to the remote control request. Typically, the remote operator makes a determination regarding passage of the vehicle 10 through the intersection I1, based on various kinds of information received from the autonomous driving control device 40. The remote operator then sends remote control commands to the vehicle 10 by operating the remote operator interface 6. The remote control commands may be manipulated variables of the travel device 60 or may be commands of the determination result such as "go", "stop", "turn right". The vehicle 10 passes through the intersection I1 according to the remote control commands sent from the remote control device 2.

In the example of the traffic environment shown in FIG. 3, another vehicle V1 in the lane L2 is traveling toward the intersection I1 when the vehicle 10 is entering the intersection I1. In such a traffic environment, the vehicle 10 in the lane L1 has priority over the other vehicle V1 in the lane L2 according to the traffic rules. Accordingly, in principle, the vehicle 10 will not be obstructed by the other vehicle V1. In a situation in which the vehicle 10 is traveling in the lane L1 and there is no oncoming vehicle in the oncoming lane, the vehicle 10 will not collide with oncoming vehicles.

There are also situations in which, even when the autonomous driving control device 40 determines that the vehicle 10 has gotten into the remote control request situation, it is less necessary for the vehicle 10 to send a remote control request depending on the subsequent dynamic surrounding environment. When the vehicle 10 immediately sends a remote control request based only on the initial determination of the autonomous driving control device 40 that the vehicle 10 has gotten into the remote control request situation, the remote control request may be sent even in a situation in which such a remote control request ends up becoming unnecessary. This increases the burden on the remote operator.

Figure 4:
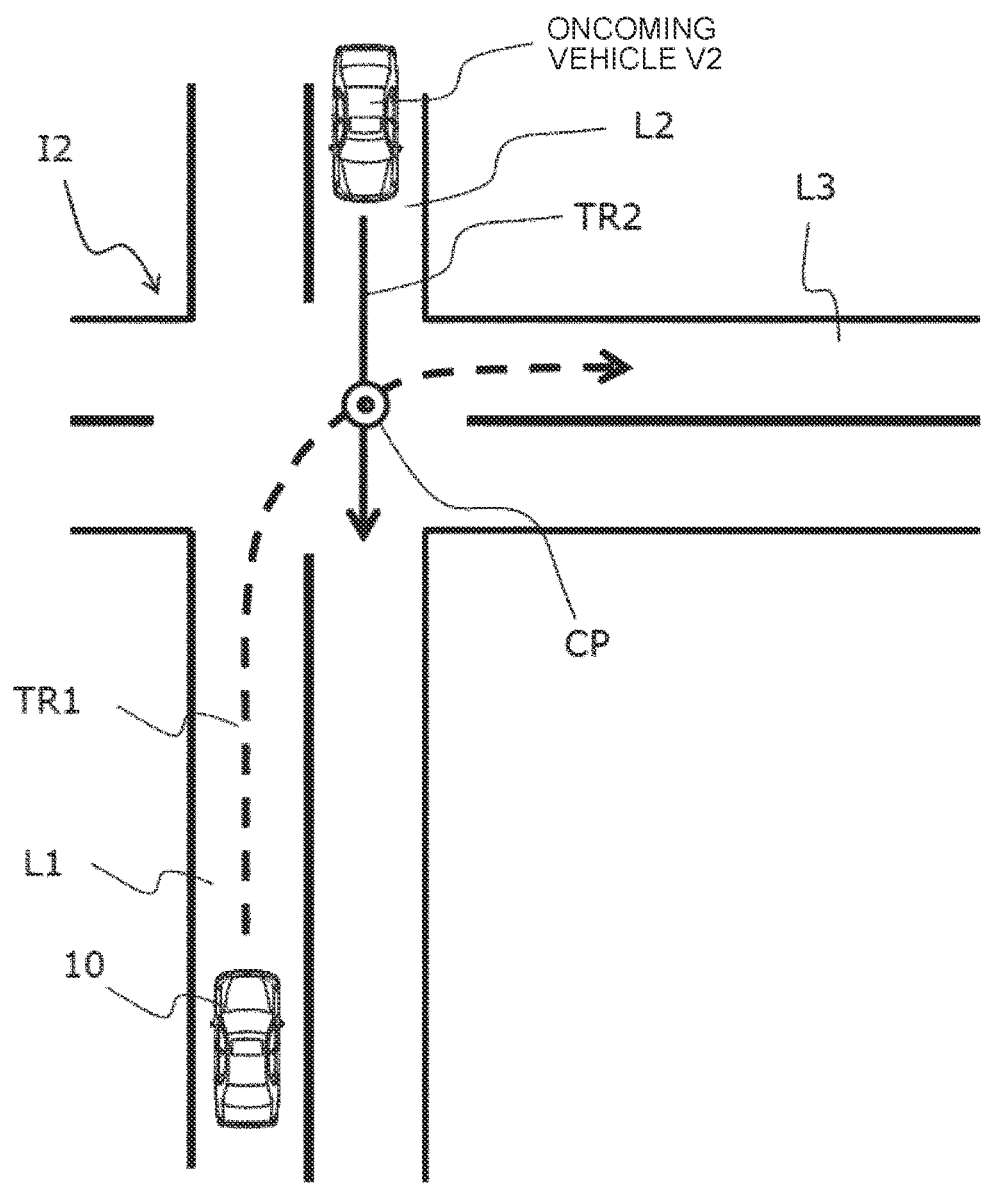
FIG. 4 shows an example of a traffic environment at an intersection in a remote control request situation.

The remote support system 100 of the first embodiment is characterized by an operation of avoiding sending a remote control request according to the subsequent dynamic surrounding environment even when the autonomous driving control device 40 determines that the vehicle 10 has gotten into the remote control request situation. FIG. 4 shows an example of a traffic environment at an intersection in the remote control request situation. In this example, the remote control request situation is a situation in which the vehicle 10 traveling in a lane L1 turns right into a lane L3 at an intersection 12.

The example shown in FIG. 4 shows a traffic environment in which the vehicle 10 autonomously traveling in the lane L1 turns right at the intersection 12 whereas an oncoming vehicle V2 traveling in the oncoming lane L2 passes straight through the intersection 12. The autonomous driving control device 40 of the vehicle 10 performs the following processes when the autonomous driving control device 40 determines that the vehicle 10 has gotten into the remote control request situation.

The autonomous driving control device 40 generates a travel trajectory TR1 of the vehicle 10 and a predicted trajectory TR2 of a detected landmark (in this example, the oncoming vehicle V2) detected as an object to be avoided regarding the remote control request situation. As used herein, the "travel trajectory" refers to a future path the vehicle 10 traveling autonomously is going to follow on a desired route, and includes a route plan and a speed plan. The route plan of the travel trajectory includes a set of desired positions on the road on which the vehicle 10 travels. The speed plan of the travel trajectory includes a desired speed for each desired position. The desired route is, for example, a route set based on the destination, the map information, and the position information of the vehicle 10. The "predicted trajectory" is a future path on the road predicted from the position, speed, and map information of the object to be avoided, and like the travel trajectory, includes a route plan and a speed plan.

The autonomous driving control device 40 calculates the point where the generated travel trajectory TR1 and the predicted trajectory TR2 intersect as a predicted collision position CP. The autonomous driving control device 40 determines based on the predicted collision position CP and the map information whether the vehicle 10 will collide with the oncoming vehicle V2 that is an object to be avoided. This process is also called the "first determination process". Typically, in the first determination process, the autonomous driving control device 40 determines that the vehicle 10 will not collide with the oncoming vehicle V2, when the traffic environment situation at the predicted collision position CP is a situation in which the vehicle 10 has priority over the oncoming vehicle V2. In the first determination process, the autonomous driving control device 40 determines that the vehicle 10 will collide with the oncoming vehicle V2, when the traffic environment situation at the predicted collision position CP is a situation in which the vehicle 10 does not have priority over the oncoming vehicle V2. Alternatively, in the first determination process, the autonomous driving control device 40 determines that a collision can be avoided by only adjusting the speed of the vehicle 10, and the vehicle 10 will not collide with an object to be avoided, when the object to be avoided is a preceding vehicle in the same lane as the vehicle 10.

The autonomous driving control device 40 determines the necessity of sending a remote control request, based on the determination result of the first determination process. This process is also called the "second determination process". In the second determination process, the autonomous driving control device 40 determines not to send a remote control request when the autonomous driving control device 40 determines in the first determination process that the vehicle 10 will not collide with the object to be avoided. On the other hand, the autonomous driving control device 40 determines to send a remote control request when the autonomous driving control device 40 determines that the vehicle 10 will collide with the object to be avoided.

According to the remote support method of the remote support system 100, even when the vehicle enters a point determined to be a remote control request point, it is avoided to send a remote control request according to the subsequent dynamic surrounding environment. The burden on the remote operator is thus reduced while ensuring the safety of the vehicle 10.

Hereinafter, the functional configuration and specific processes of the autonomous driving control device 40 of the remote support system 100 of the first embodiment will be described.

1-4. Functional Configuration of Autonomous Driving Control Device

Figure 5:
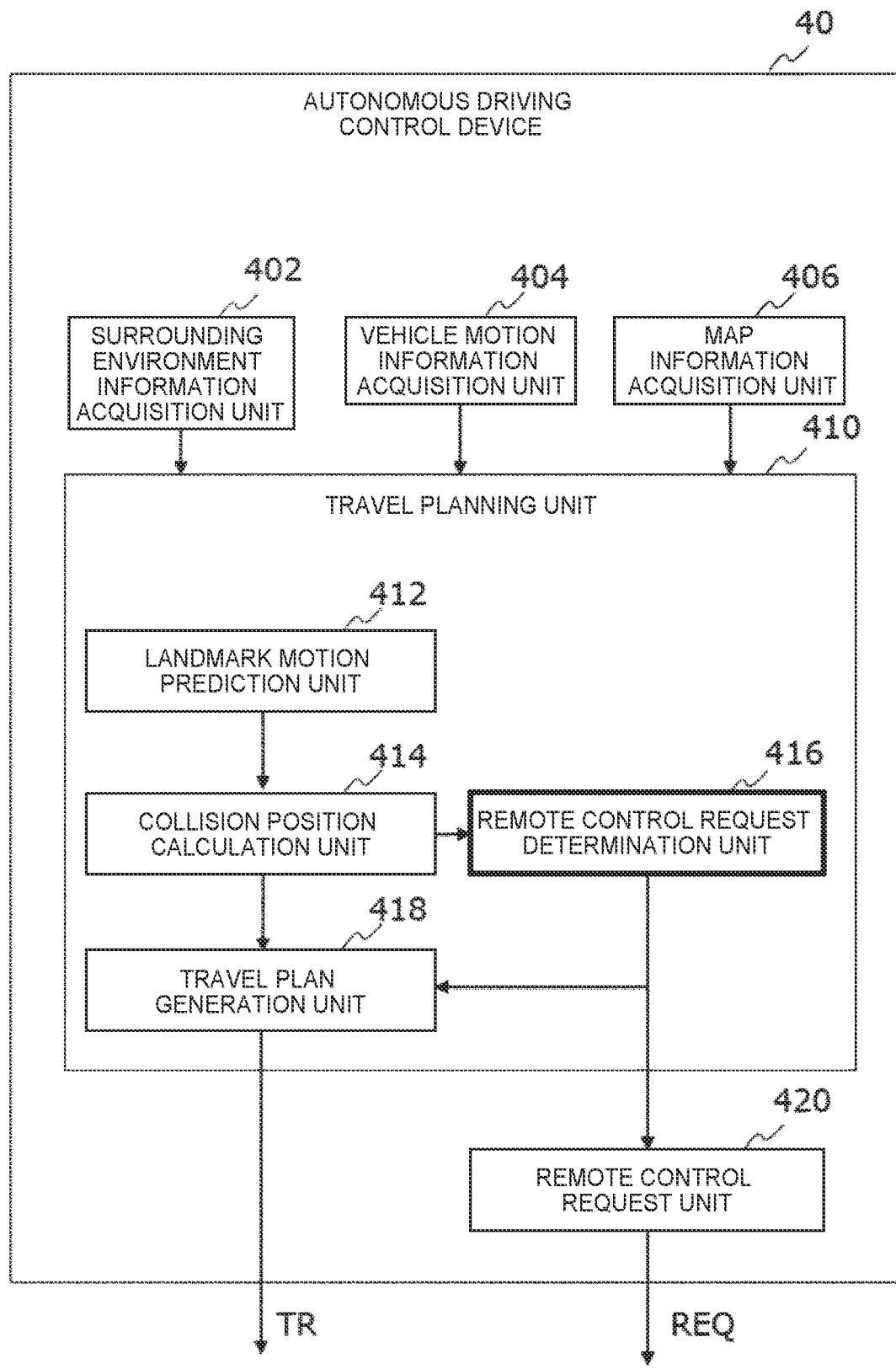
FIG. 5 is a functional block diagram showing a part of functions of an autonomous driving control device.

An example of the functional configuration of the autonomous driving control device 40 will be described. FIG. 5 is a functional block diagram showing a part of functions of the autonomous driving control device 40. The autonomous driving control device 40 includes a surrounding environment information acquisition unit 402, a vehicle motion information acquisition unit 404, a map information acquisition unit 406, a travel planning unit 410, and a remote control request unit 420.

The surrounding environment information acquisition unit 402 and the vehicle motion information acquisition unit 404 are functional blocks for acquiring the surrounding environment information and vehicle motion information detected by the information acquisition device 30, respectively. The map information acquisition unit 406 is a functional block for acquiring the map information stored in the map database 444.

The travel planning unit 410 performs a travel plan generation process and a remote control necessity determination process. The travel plan generation process is a process of generating a travel trajectory TR1 as a travel plan for automatic driving of the vehicle 10. The remote control necessity determination process is a process of determining the necessity of remote control by the remote operator.

The travel planning unit 410 typically includes a landmark motion prediction unit 412, a collision position calculation unit 414, a remote control request determination unit 416, and a travel plan generation unit 418.

The landmark motion prediction unit 412 generates a predicted trajectory TR2 of an object to be avoided that may collide with the autonomous vehicle 10. Examples of the object to be avoided include an oncoming vehicle, a preceding vehicle, and a cross vehicle traveling on a cross road. The landmark motion prediction unit 412 calculates the predicted trajectory TR2 of the object to be avoided by using the position and speed of the object to be avoided that are calculated from the surrounding environment information and the map information. When there are a plurality of predictions such as right turn, left turn, and going straight for the object to be avoided, the landmark motion prediction unit 412 may calculate a plurality of predicted trajectories TR2. The landmark motion prediction unit 412 sends the calculated predicted trajectory TR2 to the collision position calculation unit 414.

The collision position calculation unit 414 calculates a predicted collision position CP between the vehicle 10 and the object to be avoided. Typically, the collision position calculation unit 414 generates a travel trajectory TR1 of the vehicle 10 by using a desired route, position, and speed of the vehicle 10 calculated from the destination, the vehicle motion information, and the map information. The collision position calculation unit 414 also calculates the predicted collision position CP where the predicted trajectory TR2 received from the collision position calculation unit 414 and the generated travel trajectory TR1 intersect. The collision position calculation unit 414 sends the calculated predicted collision position CP to the remote control request determination unit 416 and the travel plan generation unit 418.

The remote control request determination unit 416 performs the first determination process of determining based on the predicted collision position CP whether the vehicle 10 will collide with the object to be avoided, and the second determination process of determining based on the determination result of the first determination process whether to send a remote control request. Typically, the remote control request determination unit 416 determines that it is not necessary to send a remote control request, when there is no predicted collision position CP. When there is a predicted collision position CP, the remote control request determination unit 416 determines the traffic priority situation at the predicted collision position CP by using the map information or the surrounding environment information. When the traffic priority situation at the predicted collision position CP is a situation in which the vehicle 10 has priority, the remote control request determination unit 416 determines that it is not necessary to send a remote control request. When the traffic priority situation at the predicted collision position CP is a situation in which the vehicle 10 does not have priority, the remote control request determination unit 416 determines that it is necessary to send a remote control request. The remote control request determination unit 416 sends the determination result regarding the necessity of sending a remote control request to the travel plan generation unit 418. The remote control request determination unit 416 also sends the determination result regarding the necessity of sending a remote control request to the remote control request unit 420.

The travel plan generation unit 418 generates a travel trajectory TR as a travel plan for the vehicle 10. The travel plan generation unit 418 typically generates a travel trajectory TR of the vehicle 10 based on the position and speed of the vehicle 10 calculated from the vehicle motion information, the map information, the predicted collision position CP, and the determination result regarding the necessity of sending a remote control request. Typically, when the remote control request determination unit 416 determines that it is necessary to send a remote control request, the travel plan generation unit 418 generates a travel trajectory TR in which the vehicle 10 stops immediately before the predicted collision position CP or at a predetermined stop position SP before entering the intersection and waits for remote control. Alternatively, when the remote control request determination unit 416 determines that it is not necessary to send a remote control request, the travel plan generation unit 418 generates in view of the predicted collision position CP a travel trajectory TR in which the vehicle 10 avoids a collision with the object to be avoided. The travel plan generation unit 418 sends the generated travel trajectory TR to the travel device 60.

The remote control request unit 420 is a unit for sending via the communication network N a remote control request to the remote operator who operates the remote control device 2. The remote control request unit 420 sends a remote control request REQ to the remote control device 2 according to the determination result regarding the necessity of sending a remote control request received from the remote control request determination unit 416.

Figure 6:
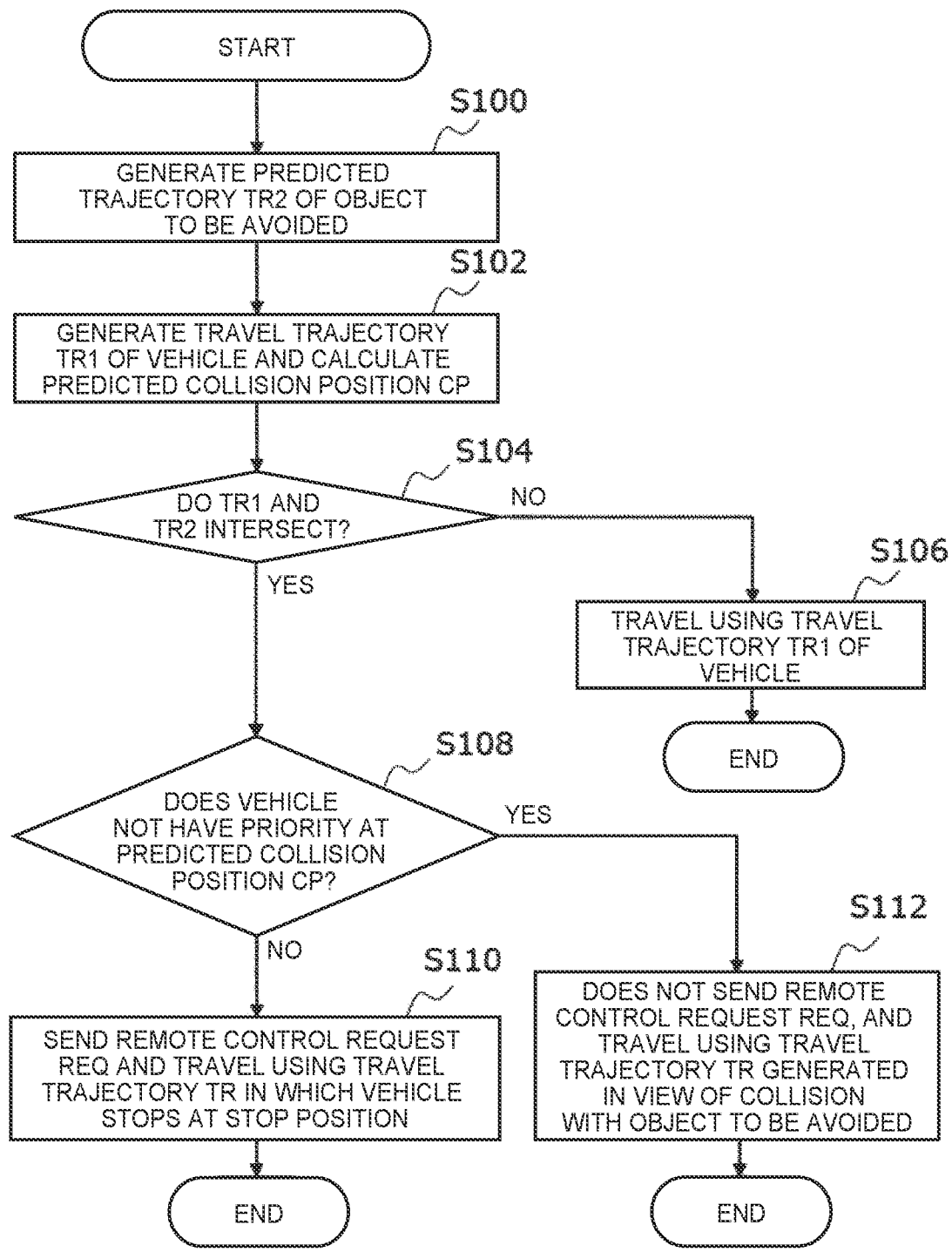
FIG. 6 is a flowchart of a process that is performed by the autonomous driving control device.

1-5. Specific Process That Is Performed by Autonomous Driving Control Device FIG. 6 is a flowchart of a process that is performed by the autonomous driving control device 40. The autonomous driving control device 40 constantly determines whether the vehicle 10 has gotten into the remote control request situation, based on the position and speed of the vehicle 10 calculated from the vehicle motion information and the map information. The autonomous driving control device 40 executes the routine of FIG. 6 when the vehicle 10 has gotten into the remote control request situation.

In step S100 of the routine of FIG. 6, the landmark motion prediction unit 412 first generates a predicted trajectory TR2 of an object to be avoided. In the following step S102, the collision position calculation unit 414 calculates a predicted collision position CP where a travel trajectory TR1 of the vehicle 10 and the predicted trajectory TR2 of the object to be avoided intersect. In the subsequent step S104, the remote control request determination unit 416 determines whether the travel trajectory TR1 and the predicted trajectory TR2 intersect. When the remote control request determination unit 416 receives a valid predicted collision position CP from the collision position calculation unit 414, the remote control request determination unit 416 determines that the travel trajectory TR1 and the predicted trajectory TR2 intersect.

When the remote control request determination unit 416 determines in step S104 that the travel trajectory TR1 and the predicted trajectory TR2 do not intersect, the remote control request determination unit 416 determines that it is not necessary to send a remote control request even when the vehicle 10 is in the remote control request situation. In this case, the routine proceeds to step S106. In step S106, the travel plan generation unit 418 uses the travel trajectory TR1 calculated in step S102 to generate a travel trajectory TR. The travel plan generation unit 418 sends the generated travel trajectory TR to the travel device 60. The travel device 60 continues autonomous driving of the vehicle 10 according to the travel trajectory TR.

When the remote control request determination unit 416 determines in step S104 that the travel trajectory TR1 and the predicted trajectory TR2 intersect, the routine proceeds to step S108. In step S108, the remote control request determination unit 416 determines based on the map information and the predicted collision position CP whether the vehicle 10 is in a traffic environment in which the vehicle 10 does not have priority over the object to be avoided at the predicted collision position CP. When the vehicle 10 does not have priority over the object to be avoided at the predicted collision position CP, the routine proceeds to step S110. When the vehicle 10 has priority over the object to be avoided at the predicted collision position CP, the routine proceeds to step S112.

In step S110, the remote control request unit 420 sends a remote control request REQ to the remote control device 2. In step S110, the travel plan generation unit 418 generates a travel trajectory TR in which the vehicle 10 stops at a predetermined stop position SP. The travel plan generation unit 418 sends the generated travel trajectory TR to the travel device 60. The travel device 60 continues autonomous driving of the vehicle 10 according to the travel trajectory TR.

In step S112, the remote control request unit 420 does not send a remote control request REQ to the remote control device 2. In step S112, the travel plan generation unit 418 generates a travel trajectory TR that involves deceleration or avoidance of steering with respect to the travel trajectory TR1 in order to prepare to avoid a collision with the object to be avoided at the predicted collision position CP. The travel plan generation unit 418 sends the generated travel trajectory TR to the travel device 60. The travel device 60 continues autonomous driving of the vehicle 10 according to the travel trajectory TR.

As described above, according to the remote support system 100 of the first embodiment, even when the vehicle 10 has gotten into the remote control request situation, the necessity of sending a remote control request is determined according to the subsequent surrounding environment. According to such a configuration, it is possible to reduce the frequency at which a remote control request is sent. The burden on the remote operator is thus reduced.

1-6. Modifications

The remote support system 100 of the first embodiment may employ the following modified modes.

There is no limitation on the functional arrangement of the autonomous driving control device 40. That is, a part or all of the functions of the autonomous driving control device 40 may be mounted on the vehicle 10 or may be provided in the remote server 4 of the remote control device 2. This modification is also applicable to a remote support system of a second embodiment described below.

Second Embodiment

Next, the remote support system 100 of the second embodiment will be described. The remote support system 100 of the second embodiment has the same configuration as that of the remote support system 100 of the first embodiment except the functional configuration of the autonomous driving control device 40. Description of the same elements as those of the remote support system 100 of the first embodiment will be omitted.

2-1. Features of Remote Support System of Second Embodiment

In the remote support system of the first embodiment, when it is determined that the vehicle 10 has gotten into the remote control request situation, the necessity of sending a remote control request is determined based on the subsequent surrounding environment information etc. When generating a predicted trajectory of an object to be avoided, the farther the vehicle 10 is located from the object to be avoided, the more distant the future behavior of the object to be avoided is predicted, and the greater the uncertainties of the surrounding environment. Accordingly, if the necessity of sending a remote control request is determined at an early stage, a plurality of predicted trajectories TR2 will be generated based on the uncertainty, and the number of predicted collision positions CPs to be considered will increase. As a result, there will be more cases where it is determined that it is necessary to send a remote control request, when determining the necessity of sending a remote control request. On the other hand, the closer the vehicle 10 is located to the object to be avoided, the smaller the uncertainties of the surrounding environment. Accordingly, the later the determination of the necessity of sending a remote control request is made, the greater the possibility that the number of cases in which it is determined that it is necessary to send a remote control request can be reduced.

However, when a remote control request is sent to the remote operator, the remote operator is not always able to start remote control of the vehicle 10 as soon as he or she receives the remote control request. This is because the remote operator having received a remote control request needs determination time until he or she grasps the surrounding situation of the vehicle 10, the contents of support, etc. and actually starts remote control. Accordingly, if the timing at which a remote control request is determined to be necessary is too late, the vehicle 10 gets closer to a remote control request point before the remote operator actually starts remote control, and the vehicle 10 needs to wait at a predetermined stop position SP before the remote control request point. This may increase the anxiety of the occupant of the vehicle 10 or may disturb the traffic of the following vehicles.

The remote support system 100 of the second embodiment is characterized by having functions for optimizing the timing at which the necessity of sending a remote control request is determined when it is determined that the vehicle has gotten into the remote control request situation.

Figure 7:
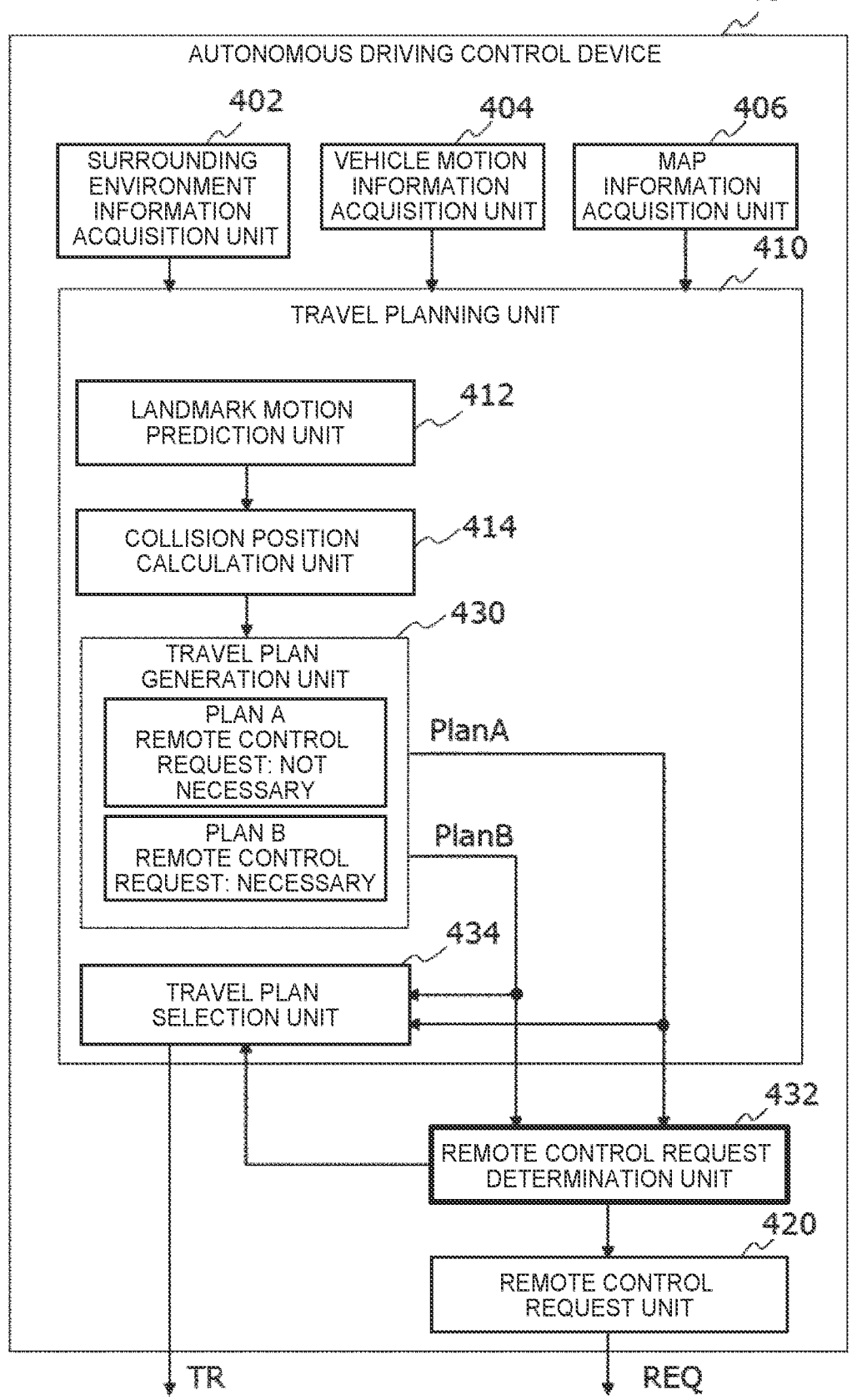
FIG. 7 is a functional block diagram showing a part of functions of an autonomous driving control device of a second embodiment.

FIG. 7 is a functional block diagram showing a part of functions of the autonomous driving control device 40 of the second embodiment. The autonomous driving control device 40 of the second embodiment includes, as configurations having the same functions as those of the autonomous driving control device 40 of the first embodiment, the surrounding environment information acquisition unit 402, the vehicle motion information acquisition unit 404, the map information acquisition unit 406, and the remote control request unit 420. The autonomous driving control device 40 of the second embodiment further has, as configurations having functions different from those of the autonomous driving control device 40 of the first embodiment, a travel plan generation unit 430, a remote control request determination unit 432, and a travel plan selection unit 434. Description of the same configurations as those of the autonomous driving control device 40 of the first embodiment will be omitted.

The travel plan generation unit 430 is a functional block for generating a travel plan for when it is not necessary to send a remote control request and a travel plan for when it is necessary to send a remote control request. In the following description, the plan A refers to the travel plan for when it is not necessary to send a remote control request, and the plan B refers to the travel plan for when it is necessary to send a remote control request. The plan A is a travel plan generated on the assumption that a remote control request will not be sent, and includes a first route plan and a first speed plan for the vehicle 10 to avoid a collision at a predicted collision position CP and to pass through a remote control request point by autonomous driving. Typically, the plan A is a travel plan including avoiding a collision with an object to be avoided by slowing down immediately before the predicted collision position CP, avoiding a collision with the object to be avoided by steering, etc. The plan B is a travel plan generated on the assumption that a remote control request will be sent, and includes a second route plan and a second speed plan for the vehicle 10 to stop at the predetermined stop position SP before the predicted collision position CP. The travel plan generation unit 430 sends both of the generated plans A and B to the remote control request determination unit 432 and the travel plan selection unit 434.

Figure 8:
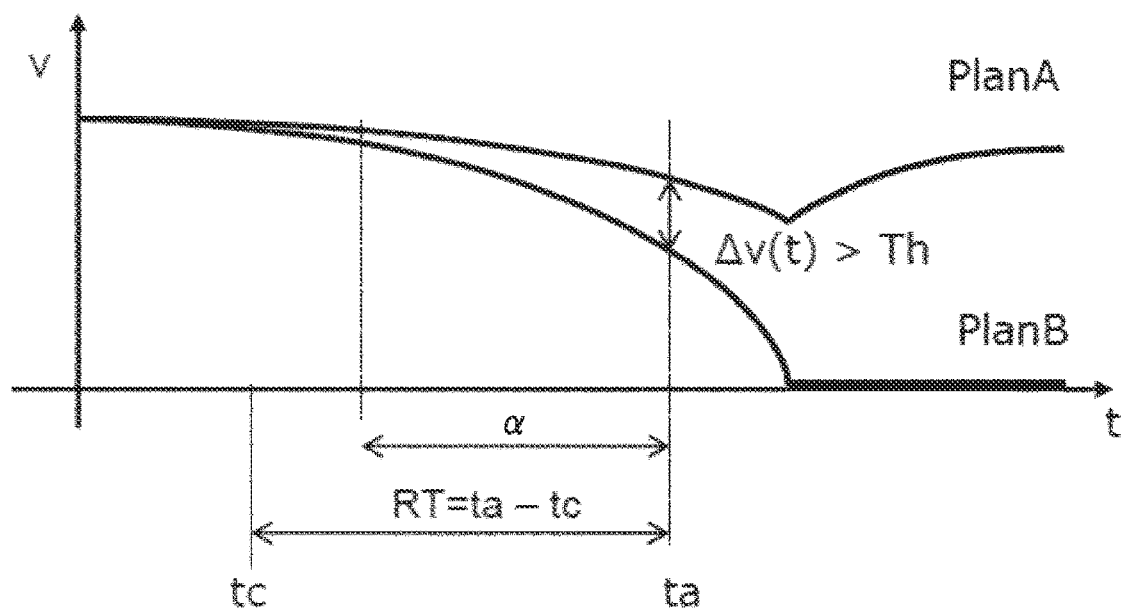
FIG. 8 shows speed plans of plans A and B generated by a travel plan generation unit.

The remote control request determination unit 432 is a functional block for performing a second determination process of determining the necessity of sending a remote control request REQ based on the plans A and B received from the travel plan generation unit 430. FIG. 8 shows the speed plans of the plans A and B generated by the travel plan generation unit 430. In the example shown in this figure, the plan A is a speed plan in which the vehicle 10 slows down and passes through the predicted collision position CP, and the plan B is a speed plan in which the vehicle 10 stops before the predicted collision position CP. Comparison between the plans A and B shows that the deceleration in the plan B is greater than the deceleration in the plan A. The speed difference $\Delta v(t)$ at time t between the plans A and B therefore increases with the passage of time.

As described above, it takes about several tens of seconds as predetermined determination time until the remote operator actually starts remote control after receiving a remote control request. Accordingly, for example, when a remote control request is sent and the vehicle 10 is controlled to travel according to the plan B, the remote operator starts the remote control the predetermined determination time after he or she receives the remote control request. Therefore, when the speed of the vehicle 10 is changed from the speed of the speed plan in the plan B to the speed of the speed plan in the plan A by the remote control by the remote operator without disturbing the traffic of the following vehicles, the vehicle 10 may behave like suddenly speeding up, depending on the magnitude of the speed difference $\Delta v(t)$. As a result, the occupant may feel uncomfortable. That is, the speed difference $\Delta v(t)$ has an allowable limit for not making the occupant feel uncomfortable immediately after the remote operator starts remote control.

The remote control request determination unit 432 calculates time ta when the speed difference $\Delta v(t)$ becomes a predetermined threshold Th corresponding to the allowable limit. The remote control request determination unit 432 then compares the remaining time RT (=ta−tc) from the current time tc to the time ta with the determination time $\alpha$ for the remote operator to determine the necessity of sending a remote control request. The determination time $\alpha$ is the amount of time determined in advance as the time required before the remote operator starts remote control. Typically, the determination time $\alpha$ is, for example, between 10 seconds and 15 seconds.

When the remaining time RT is longer than the determination time $\alpha$, it can be determined that the remote operator can start remote control before the speed difference $\Delta v(t)$ reaches the allowable limit. The remote control request determination unit 432 determines that it is not necessary to send a remote control request as long as RT>$\alpha$ is satisfied. The remote control request determination unit 432 determines that it is necessary to send a remote control request when RT>$\alpha$ is no longer satisfied. The remote control request determination unit 432 sends the determination result regarding the necessity of sending a remote control request to the travel plan selection unit 434. The remote control request determination unit 432 also sends the determination result regarding the necessity of sending a remote control request to the remote control request unit 420.

The travel plan selection unit 434 selects a travel plan for the vehicle 10 based on the travel plan of the plan A, the travel plan of the plan B, and the determination result regarding the necessity of sending a remote control request. Typically, the remote control request determination unit 432 selects the travel plan of the plan A when it receives the determination result that it is not necessary to send a remote control request. The remote control request determination unit 432 selects the travel plan of the plan B when it receives the determination result that it is necessary to send a remote control request. The remote control request determination unit 432 outputs a travel trajectory TR corresponding to the selected travel plan to the travel device 60.

Figure 9:
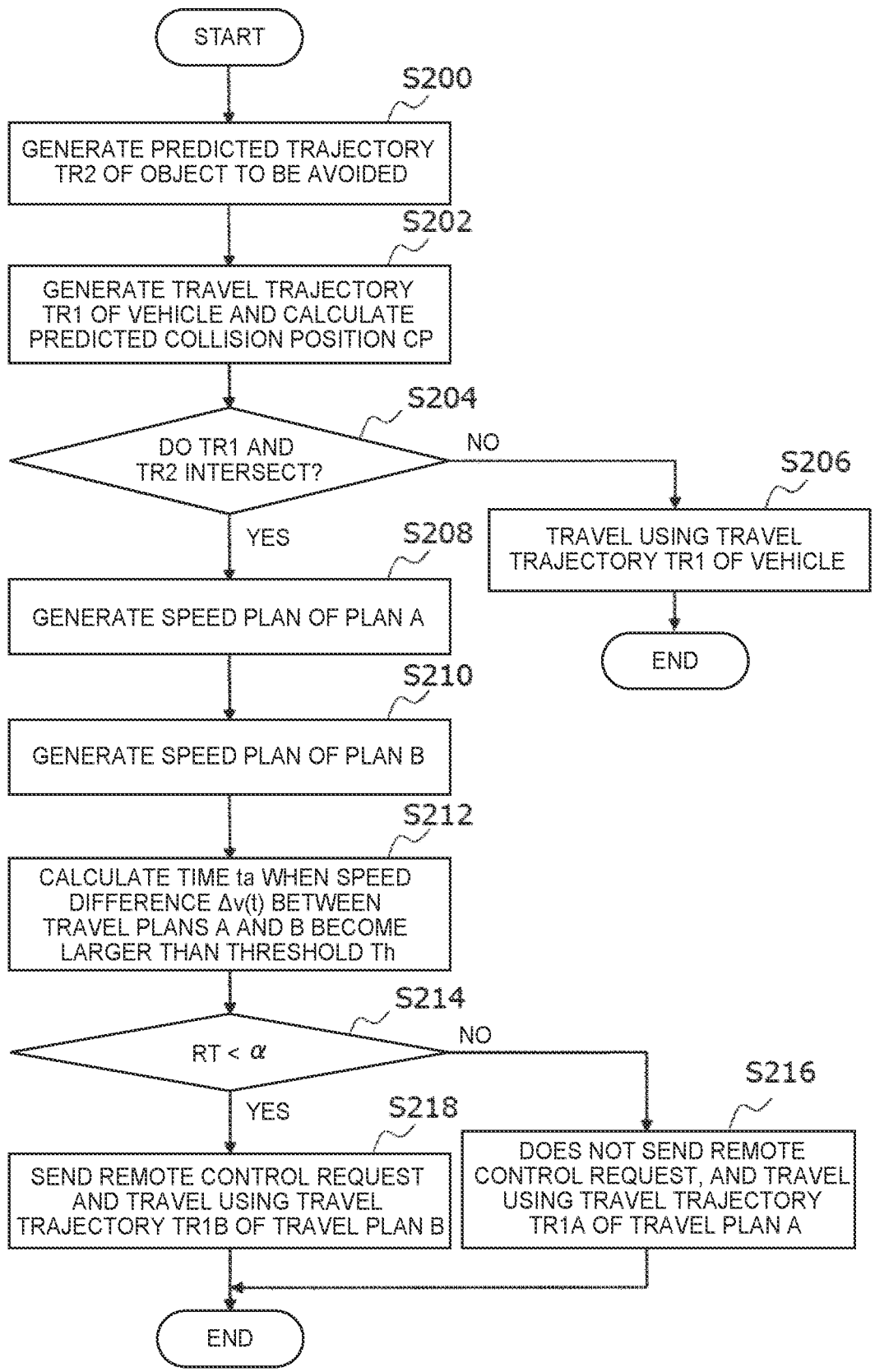
FIG. 9 is a flowchart of a process that is performed by the autonomous driving control device of the second embodiment.

2-2. Specific Process That Is Performed by Autonomous Driving Control Device of Second Embodiment FIG. 9 is a flowchart of a process that is performed by the autonomous driving control device 40 of the second embodiment. Like the routine shown in FIG. 6, the routine shown in FIG. 9 is repeatedly executed in predetermined control cycles by the autonomous driving control device 40 when the vehicle 10 has gotten into the remote control request situation.

In steps S200, S202, S204, and S206 of the routine shown in FIG. 9, the autonomous driving control device 40 performs processing similar to that of steps S100, S102, S104, and S106 of the routine shown in FIG. 6. By performing steps S200, S202, and S204, the autonomous driving control device 40 performs the first determination process of determining whether the vehicle 10 will collide with an object to be avoided.

When the autonomous driving control device 40 determines in step S204 that the travel trajectory TR1 and the predicted trajectory TR2 intersect, it can be determined that the autonomous driving control device 40 has determined in the first determination process that the vehicle 10 will collide with the object to be avoided. In this case, the routine proceeds from step S204 to step S208. In step S208, the travel plan generation unit 430 generates a travel trajectory TR1A of the plan A that involves deceleration or avoidance of steering with respect to the travel trajectory TR1 in order to prepare to avoid a collision with the object to be avoided at the predicted collision position CP. When step S208 is completed, the routine proceeds to step S210.

In step S210, the travel plan generation unit 430 generates a travel trajectory TR1B of the plan B in which the vehicle 10 waits for remote control at a predetermined waiting point before the predicted collision position CP. When step S210 is completed, the routine proceeds to step S212.

In step S212, the remote control request determination unit 432 calculates the time ta when the speed difference Δv(t) at time t between the plan A and the plan B is larger than the threshold Th. In the following step S214, the remote control request determination unit 432 calculates the remaining time RT from the current time tc to the time ta, and determines whether the calculated remaining time RT is shorter than the determination time α for the remote operator.

When the determination result of step S214 is that the remaining time RT is not shorter than the determination time α, the remote control request determination unit 432 determines that it is not necessary to send a remote control request in this cycle, and the routine proceeds to step S216. In step S216, the remote control request unit 420 does not send a remote control request REQ to the remote control device 2. The travel plan selection unit 434 selects the travel trajectory TR1A of the plan A and sends it to the travel device 60 as a travel trajectory TR. The travel device 60 continues autonomous driving of the vehicle 10 according to the travel trajectory TR.

When the determination result of step S214 is that the remaining time RT is shorter than the determination time α, the remote control request determination unit 432 determines that it is necessary to send a remote control request in this cycle, and the routine proceeds to step S218. In step S218, the remote control request unit 420 sends a remote control request REQ to the remote control device 2 on which the remote operator stands by. In step S218, the travel plan selection unit 434 selects the travel trajectory TR1B of the plan B and sends it to the travel device 60 as a travel trajectory TR. The travel device 60 continues autonomous driving of the vehicle 10 according to the travel trajectory TR.

As described above, according to the remote support method of the remote support system 100 of the second embodiment, even when the vehicle 10 has gotten into the remote control request situation, a remote control request will not be sent as long as the remaining time RT is longer than the determination time α for the remote operator. In the remote support system 100, a remote control request is sent when the remaining time RT becomes shorter than the determination time α for the remote operator. According to such a configuration, the determination of the necessity of sending a remote control request can be delayed until the speed difference Δv(t) reaches the allowable limit. The frequency of sending a remote control request can therefore be reduced while preventing the occupant from feeling uncomfortable. This reduces the burden on the remote operator.

2-3. Application Examples to Specific Traffic Environment Situations

2-3-1. First Application Example

Figure 10:
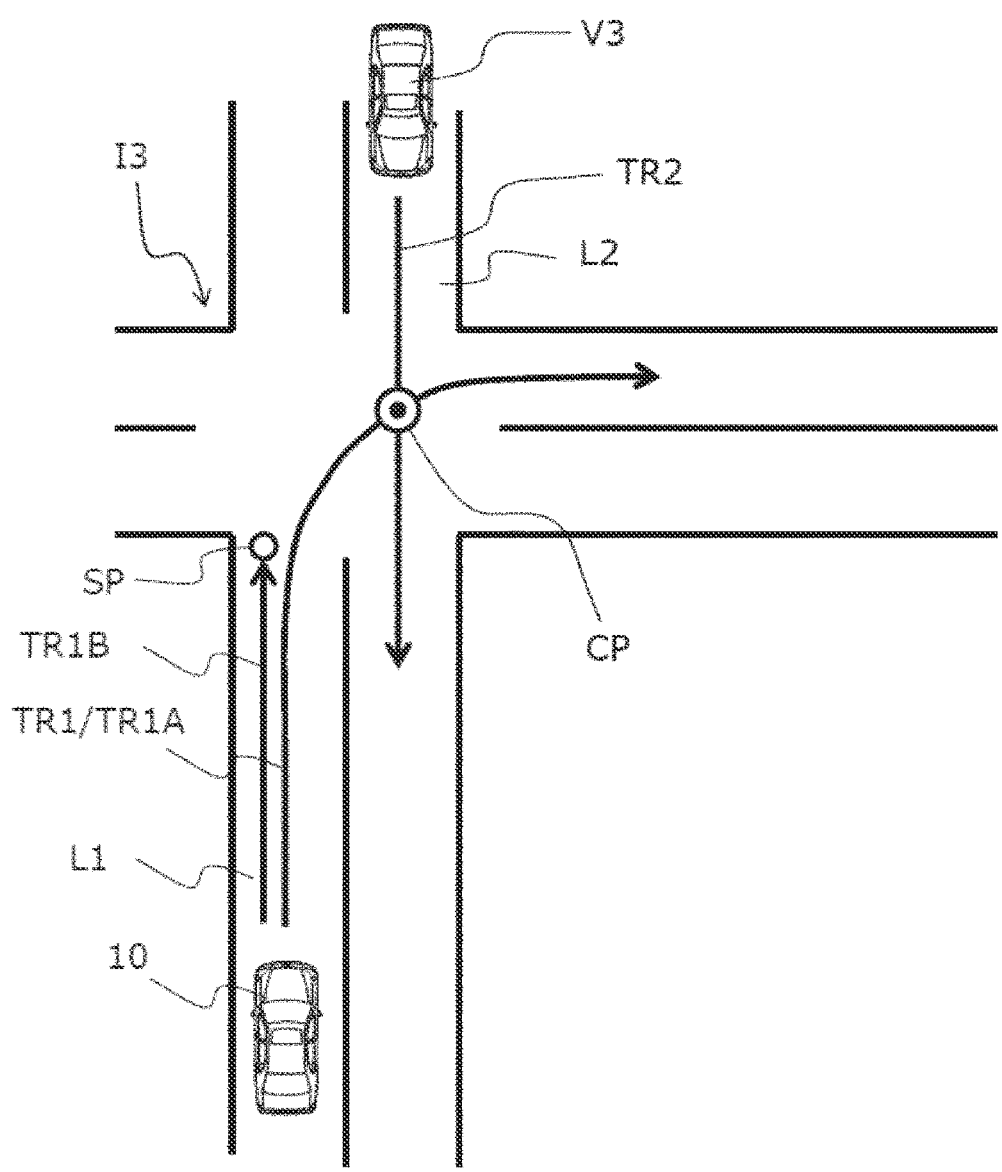
FIG. 10 shows a first application example of the remote support system.

FIG. 10 shows a first application example of the remote support system. In FIG. 10, the vehicle 10 is traveling in a lane L1. The vehicle 10 is supposed to enter an intersection 13. An oncoming vehicle V3 in a lane L2 is traveling on the opposite side of the intersection 13 from the vehicle 10. Like the vehicle 10, the oncoming vehicle V3 is also supposed to enter the intersection 13.

In the first application example, the autonomous driving control device 40 generates a travel trajectory TR1 in which the vehicle 10 turns right at the intersection 13 and a predicted trajectory TR2 in which the oncoming vehicle V3 passes straight through the intersection 13. When the travel trajectory TR1 and the predicted trajectory TR2 do not intersect, the autonomous driving control device 40 performs autonomous driving of the vehicle 10 according to the travel trajectory TR1.

Figure 11:
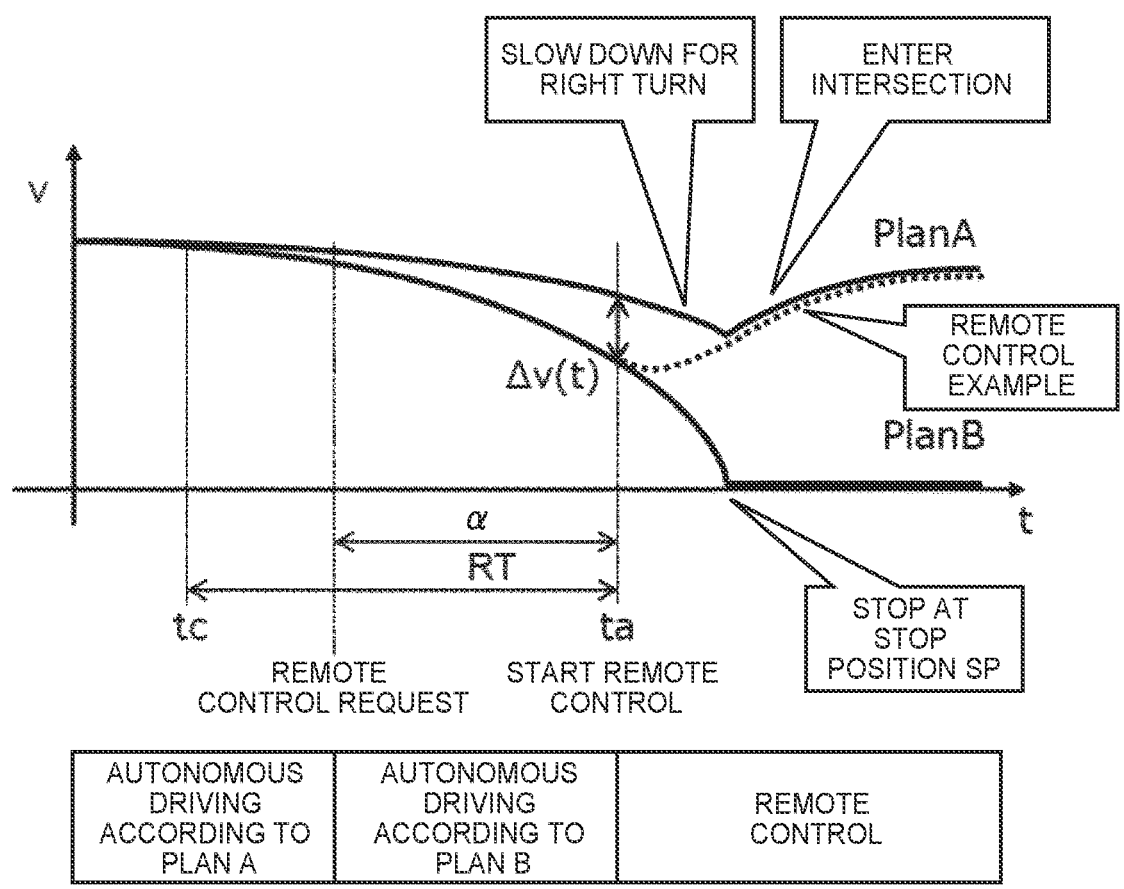
FIG. 11 shows an example of speed plans of plans A and B generated in the first application example of the remote support system.

When there is a predicted collision position CP where the travel trajectory TR1 and the predicted trajectory TR2 intersect in the traffic environment situation shown in FIG. 10, the autonomous driving control device 40 generates a travel trajectory TR1A based on a plan A and a travel trajectory TR1B based on a plan B. FIG. 11 shows an example of speed plans of the plans A and B generated in the first application example of the remote support system. The travel trajectory TR1A is a travel trajectory in which the vehicle 10 slows down and turns right at the intersection 13. The travel trajectory TR1A is typically the same as the travel trajectory TR1. The travel trajectory TR1B is a travel trajectory in which the vehicle 10 stops at a predetermined stop position SP before the predicted collision position CP.

The autonomous driving control device 40 performs autonomous driving of the vehicle 10 according to the travel trajectory TR1A of the plan A as long as the remaining time RT>the determination time α. When the traffic environment situation changes to a situation in which the travel trajectory TR1 and the predicted trajectory TR2 do not intersect while the remaining time RT>the determination time α, the autonomous driving control device 40 performs autonomous driving of the vehicle 10 according to the travel trajectory TR1.

When the remaining time RT < the determination time α is satisfied while the traffic environment situation in which the travel trajectory TR1 and the predicted trajectory TR2 intersect has not been eliminated, the autonomous driving control device 40 sends a remote control request and performs autonomous driving of the vehicle 10 according to the travel trajectory TR1B of the plan B. In response to the remote control request, the remote operator starts remote control before time to elapses, as in the remote control example shown in the figure. For example, the remote operator controls the vehicle 10 to speed up or slow down to the extent that does not make the occupant feel uncomfortable and to turn right at the intersection 13.

2-3-2. Second Application Example

Figure 12:
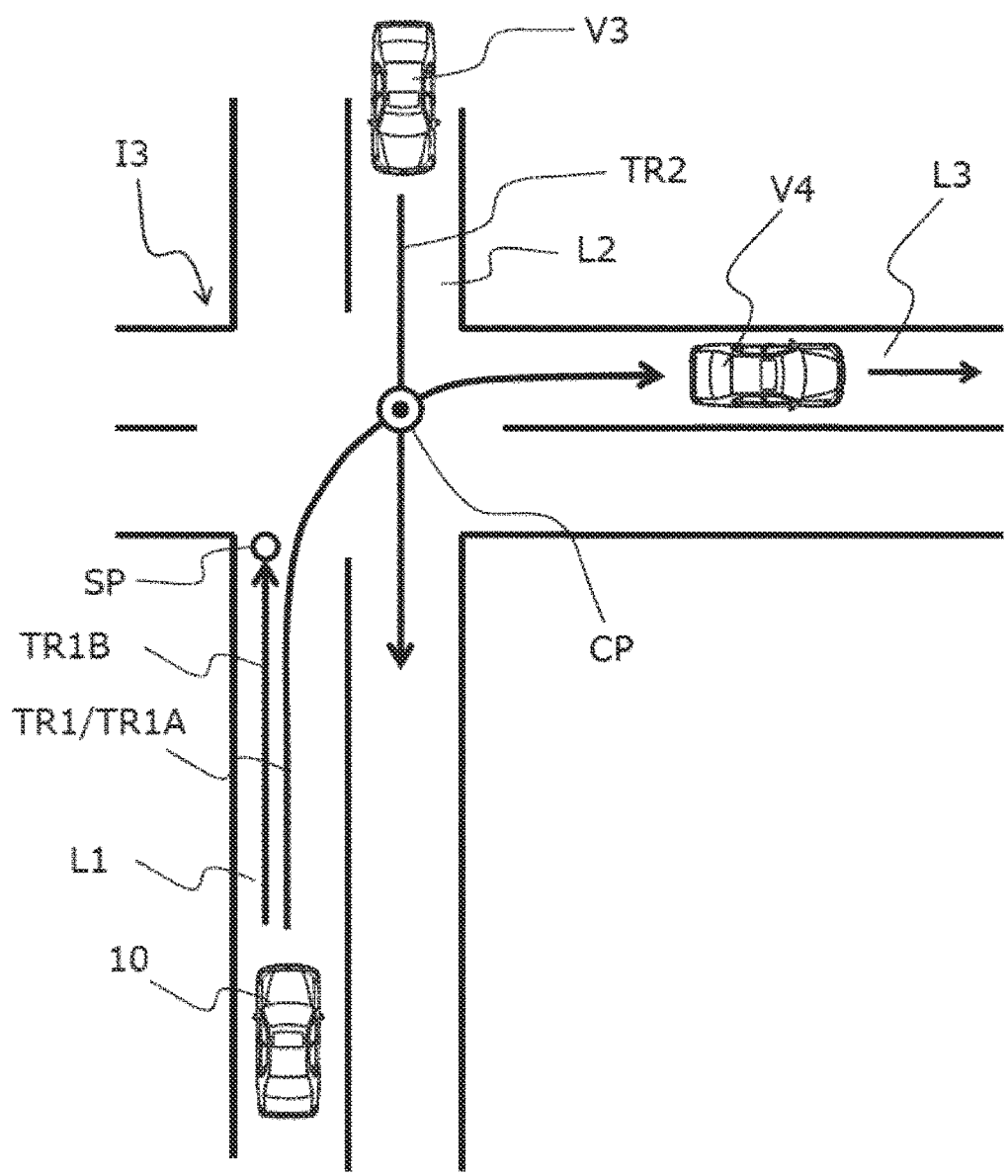
FIG. 12 shows a second application example of the remote support system.

FIG. 12 shows a second application example of the remote support system. In FIG. 12, in addition to the traffic environment situation of the first application example shown in FIG. 10, a preceding vehicle V4 is traveling in a lane L3 into which the vehicle 10 turns right at the intersection 13.

In the second application example, the autonomous driving control device 40 generates a travel trajectory TR1 in which the vehicle 10 avoids a collision with the preceding vehicle V4 after turning right at the intersection 13 and a predicted trajectory TR2 in which the oncoming vehicle V3 passes straight through the intersection 13. When the travel trajectory TR1 and the predicted trajectory TR2 do not intersect, the autonomous driving control device 40 performs autonomous driving of the vehicle 10 according to the travel trajectory TR1.

When the travel trajectory TR1 and the predicted trajectory TR2 intersect at a predicted collision position CP in the traffic environment situation shown in FIG. 12, the autonomous driving control device 40 generates a travel trajectory TR1A based on a plan A and a travel trajectory TR1B based on a plan B. In this case, the autonomous driving control device 40 generates the travel trajectory TR1B in which the vehicle 10 avoids a collision with the preceding vehicle V4. The subsequent processing is similar to that of the first application example.

2-3-3. Third Application Example

Figure 13:
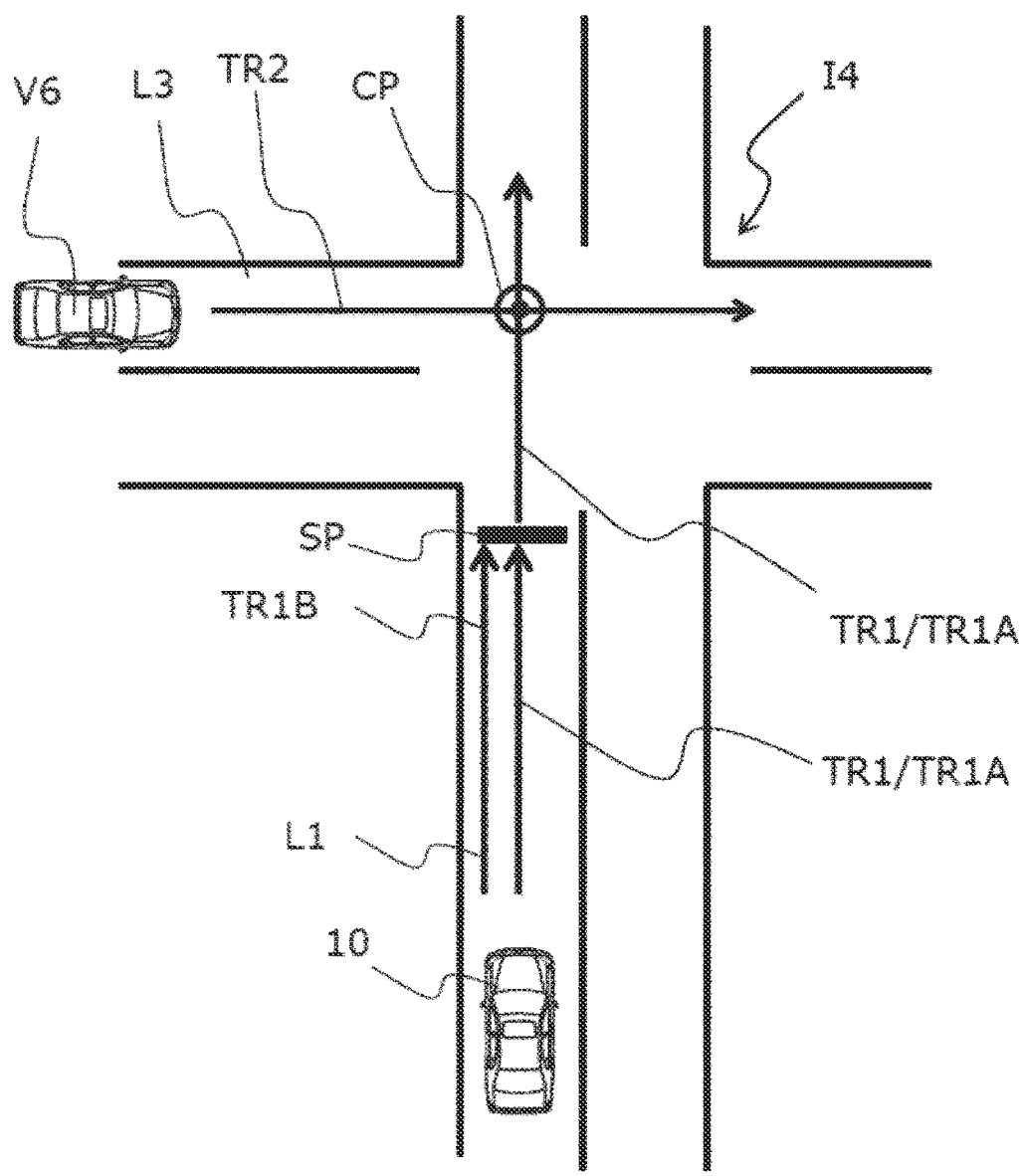
FIG. 13 shows a third example of the remote support system.

FIG. 13 shows a third application example of the remote support system. In FIG. 13, the vehicle 10 is traveling in a lane L1. The vehicle 10 is supposed to enter an intersection 14 with a stop line. A vehicle V6 on the left front side of the vehicle 10 is traveling toward the intersection 14 in a lane L3 intersecting the lane L1. Like the vehicle 10, the vehicle V6 is also supposed to enter the intersection 14.

In the third application example, the autonomous driving control device 40 generates a travel trajectory TR1 in which the vehicle 10 starts moving after stopping at the stop line before the intersection 14 and a predicted trajectory TR2 in which the vehicle V6 passes straight through the intersection 14. When the travel trajectory TR1 and the predicted trajectory TR2 do not intersect, the autonomous driving control device 40 performs autonomous driving of the vehicle 10 according to the travel trajectory TR1.

Figure 14:
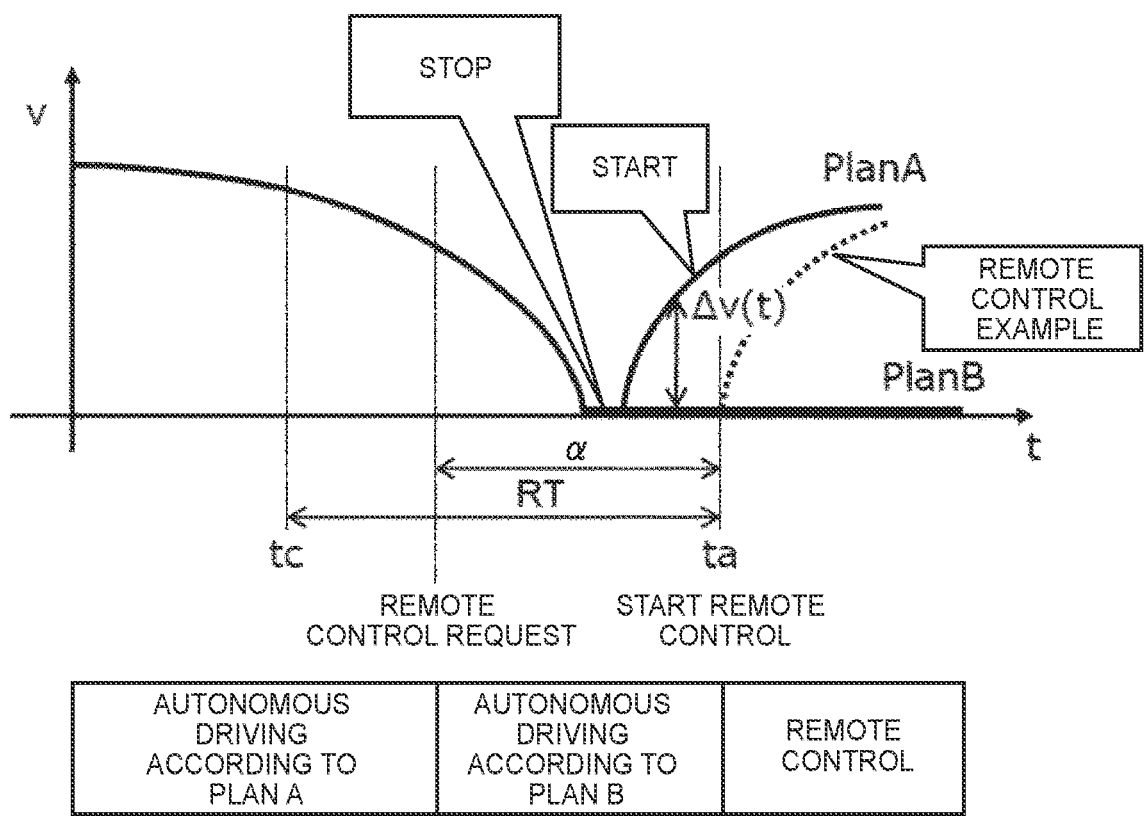
FIG. 14 shows an example of speed plans of plans A and B generated in the third application example of the remote support system.

When there is a predicted collision position CP where the travel trajectory TR1 and the predicted trajectory TR2 intersect in the traffic environment situation shown in FIG. 13, the autonomous driving control device 40 generates a travel trajectory TR1A based on a plan A and a travel trajectory TR1B based on a plan B. FIG. 14 shows an example of speed plans of the plans A and B generated in the third application example of the remote support system. The travel trajectory TR1A is a travel trajectory in which the vehicle 10 starts moving after stopping at the stop line before the intersection 14. The travel trajectory TR1A is typically the same as the travel trajectory TR1. The travel trajectory TR1B is a travel trajectory in which the vehicle 10 stops and waits at the stop line before the intersection 14 set as the stop position SP.

In the third application example, the longer the vehicle 10 stops at the stop position SP according to the travel trajectory TR1B, the larger the speed difference Δv(t). Therefore, Δv(t) is an index for determining whether the traffic of the vehicles behind the vehicle 10 is disturbed. The autonomous driving control device 40 performs autonomous driving of the vehicle 10 according to the travel trajectory TR1A of the plan A as long as the remaining time RT>the determination time α. When the traffic environment situation changes to a situation in which the travel trajectory TR1 and the predicted trajectory TR2 do not intersect while the remaining time RT>the determination time α, the autonomous driving control device 40 performs autonomous driving of the vehicle 10 according to the travel trajectory TR1.

When the remaining time RT<the determination time α is satisfied while the traffic environment situation in which the travel trajectory TR1 and the predicted trajectory TR2 intersect has not been eliminated, the autonomous driving control device 40 determines that the vehicle 10 waiting for the start of remote control at the stop position SP may disturb the traffic of the following vehicles. In this case, the autonomous driving control device 40 sends a remote control request and performs autonomous driving of the vehicle 10 according to the travel trajectory TR1B of the plan B. In response to the remote control request, the remote operator starts remote control before time to elapses, as in the remote control example shown in the figure. As a result, the vehicle 10 is started before disturbing the traffic of the following vehicles.

When there is a blind spot of the vehicle 10 at the intersection I4, the third application example may be applied on the assumption that an object to be avoided is present in the blind spot.

2-3-4. Fourth Application Example

Figure 15:
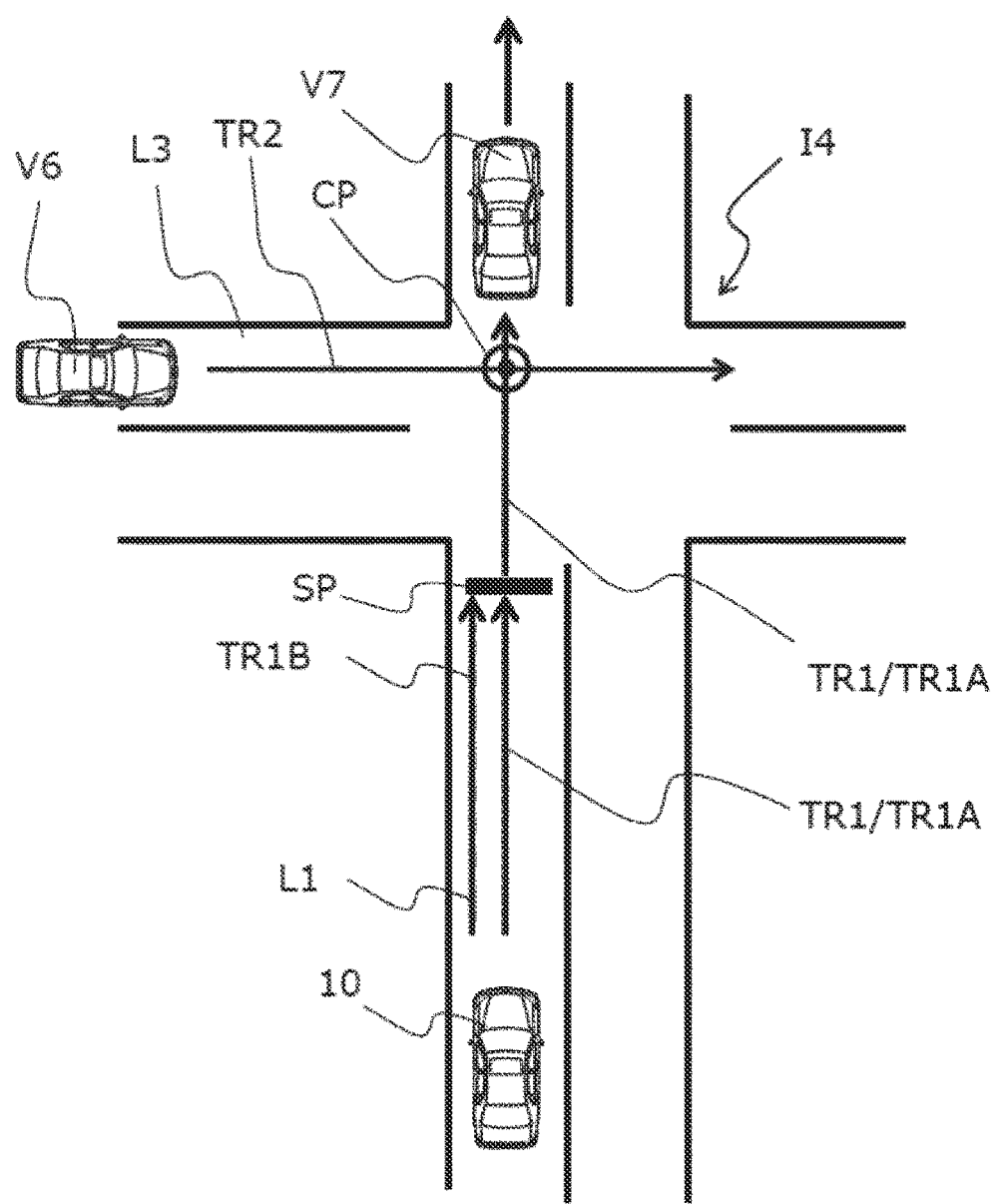
FIG. 15 shows a fourth application example of the remote support system.

FIG. 15 shows a fourth application example of the remote support system. In FIG. 15, in addition to the traffic environment situation of the third application example shown in FIG. 13, a preceding vehicle V7 is traveling in the lane L1 after the intersection I4. The vehicle 10 is supposed to travel straight through the intersection I4.

In the fourth application example, the autonomous driving control device 40 generates a travel trajectory TR1 in which the vehicle 10 starts moving so as to avoid a collision with the preceding vehicle V7 after stopping at the stop line before the intersection I4 and a predicted trajectory TR2 in which the vehicle V6 passes straight through the intersection 14. When the travel trajectory TR1 and the predicted trajectory TR2 do not intersect, the autonomous driving control device 40 performs autonomous driving of the vehicle 10 according to the travel trajectory TR1.

When the travel trajectory TR1 and the predicted trajectory TR2 intersect at a predicted collision position CP in the traffic environment situation shown in FIG. 15, the autonomous driving control device 40 generates a travel trajectory TR1A based on a plan A and a travel trajectory TR1B based on a plan B. In this case, the autonomous driving control device 40 generates the travel trajectory TR1B in which the vehicle 10 avoids a collision with the preceding vehicle V7. The subsequent processing is similar to that of the first application example.

2-3-5. Fifth Application Example

Figure 16:
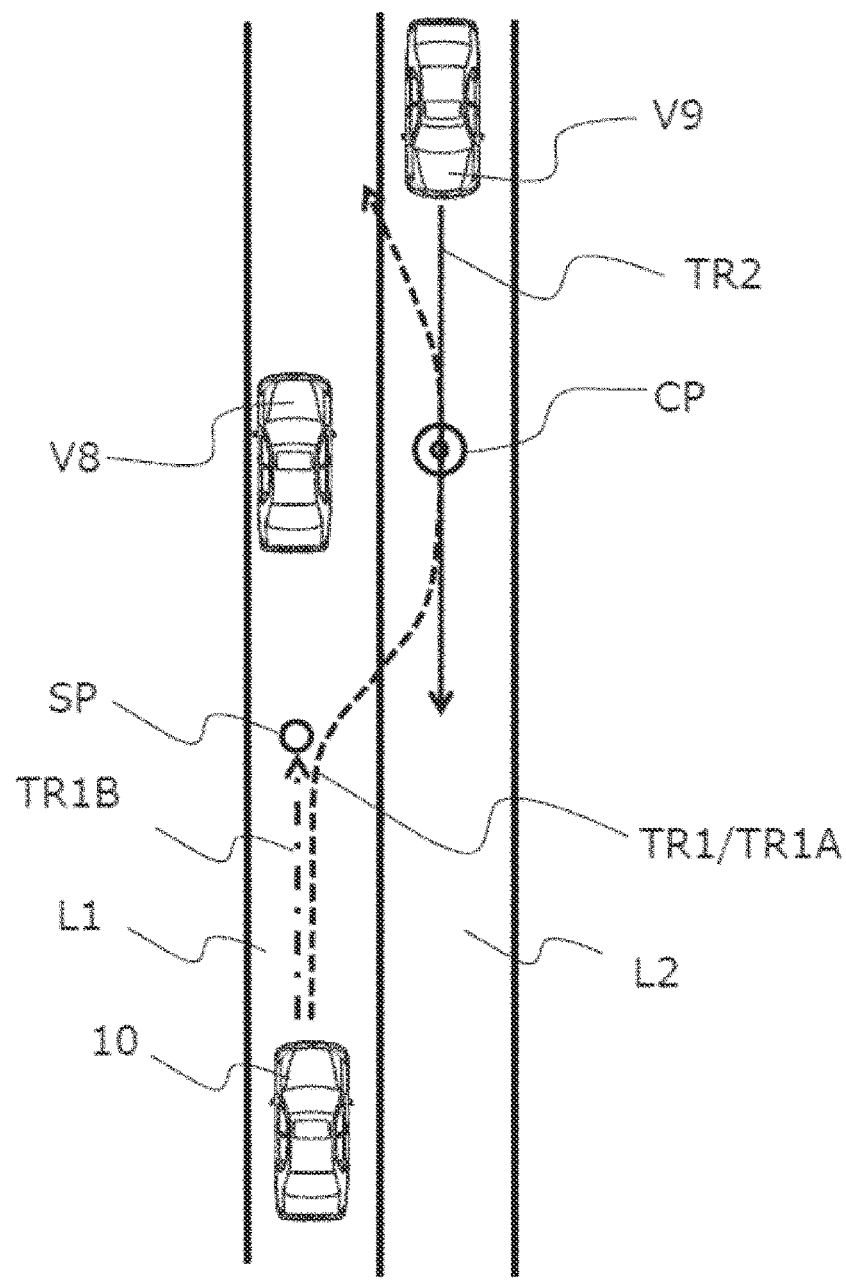
FIG. 16 shows a fifth application example of the remote support system.

FIG. 16 shows a fifth application example of the remote support system. In FIG. 16, the vehicle 10 is traveling in a lane L1. A lane L2 adjacent to the lane L1 is a lane for vehicles traveling in the direction opposite to the direction of travel of the vehicle 10. There is a stopped vehicle V8 in the lane L1 in front of the vehicle 10. The stopped vehicle V8 is an object to be avoided that obstructs vehicles traveling in the lane L1. There is also an oncoming vehicle V9 in the lane L2 in front of the vehicle 10.

In the fifth application example, the autonomous driving control device 40 generates a travel trajectory TR1 in which the vehicle 10 moves from the lane L1 into the lane L2 and passes the stopped vehicle V8 on the right and a predicted trajectory TR2 in which the oncoming vehicle V9 travels straight in the lane L2. When the travel trajectory TR1 and the predicted trajectory TR2 do not intersect, the autonomous driving control device 40 performs autonomous driving of the vehicle 10 according to the travel trajectory TR1.

When there is a predicted collision position CP where the travel trajectory TR1 and the predicted trajectory TR2 intersect in the traffic environment situation shown in FIG. 16, the autonomous driving control device 40 generates a travel trajectory TR1A based on a plan A and a travel trajectory TR1B based on a plan B. The travel trajectory TR1A is a travel trajectory in which the vehicle 10 slows down and passes the stopped vehicle V8 on the right. The travel trajectory TR1A is typically the same as the travel trajectory TR1. The travel trajectory TR1B is a travel trajectory in which the vehicle 10 stops at a predetermined stop position SP before the stopped vehicle V8.

The autonomous driving control device 40 performs autonomous driving of the vehicle 10 according to the travel trajectory TR1A of the plan A as long as the remaining time RT>the determination time α. When the traffic environment situation changes to a situation in which the travel trajectory TR1 and the predicted trajectory TR2 do not intersect while the remaining time RT>the determination time α, the autonomous driving control device 40 performs autonomous driving of the vehicle 10 according to the travel trajectory TR1. When the stopped vehicle V8 starts moving while the remaining time RT>the determination time α, the autonomous driving control device 40 generates, for example, a travel trajectory TR1 in which the vehicle 10 slows down and follows the stopped vehicle V8 without passing the stopped vehicle V8. In this case, since the travel trajectory TR1 and the predicted trajectory TR2 do not intersect, the autonomous driving control device 40 performs autonomous driving of the vehicle 10 according to the travel trajectory TR1.

When the remaining time RT<the determination time α is satisfied while the traffic environment situation in which the travel trajectory TR1 and the predicted trajectory TR2 intersect has not been eliminated, the autonomous driving control device 40 sends a remote control request and performs autonomous driving of the vehicle 10 according to the travel trajectory TR1B of the plan B. In response to the remote control request, the remote operator starts remote control before time to elapses. For example, the remote operator controls the vehicle 10 to speed up or slow down to the extent that does not make the occupant feel uncomfortable and to pass the stopped vehicle V8 while avoiding a collision with the oncoming vehicle V9.

2-3-6. Sixth Application Example

Figure 17:
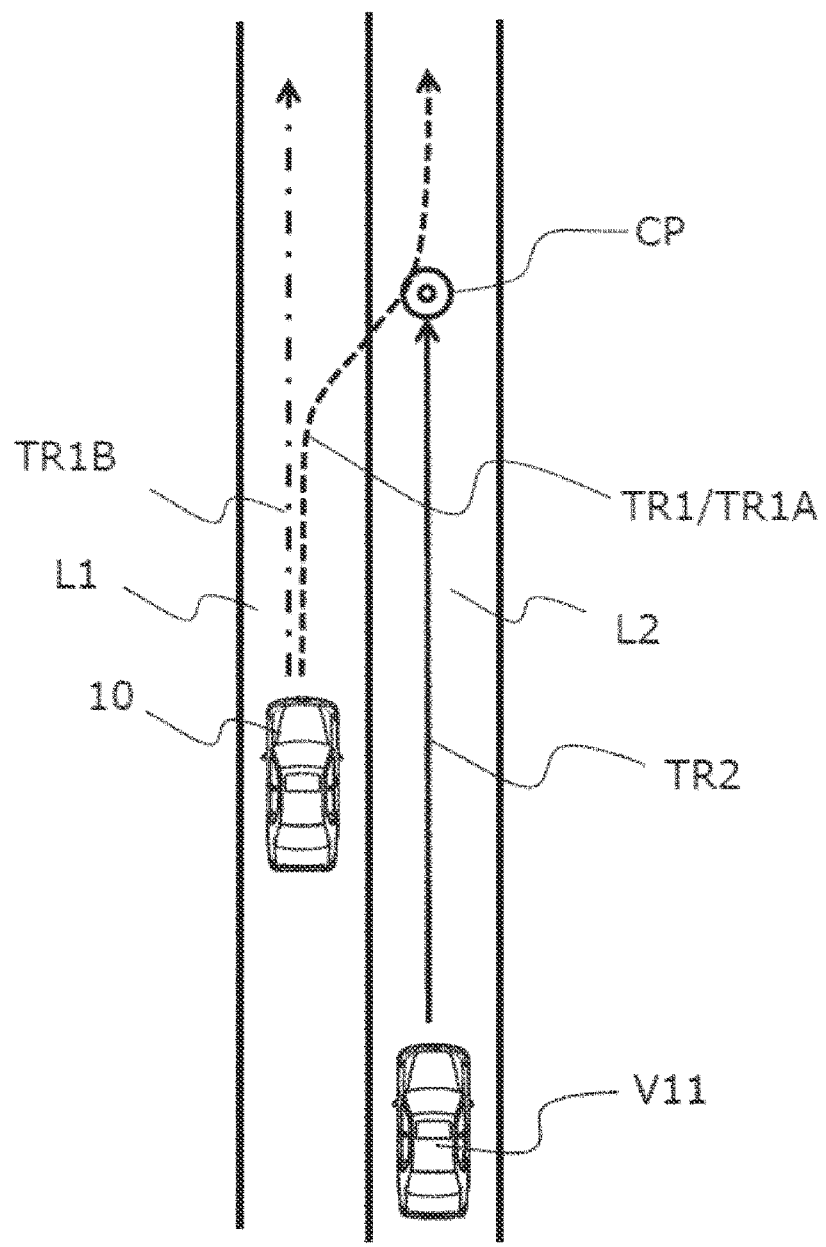
FIG. 17 shows a sixth application example of the remote support system.

FIG. 17 shows a sixth application example of the remote support system. In FIG. 17, the vehicle 10 is traveling in a lane L1. A lane L2 adjacent to the lane L1 is a lane for vehicles traveling in the same direction as the direction of travel of the vehicle 10. A vehicle V11 in the lane L2 is traveling behind the vehicle 10.

In the sixth application example, the autonomous driving control device 40 generates a travel trajectory TR1 in which the vehicle 10 changes lanes from the lane L1 to the lane L2 while speeding up and a predicted trajectory TR2 in which the vehicle V11 travels straight in the lane L2. When the travel trajectory TR1 and the predicted trajectory TR2 do not intersect, the autonomous driving control device 40 performs autonomous driving of the vehicle 10 according to the travel trajectory TR1.

Figure 18:
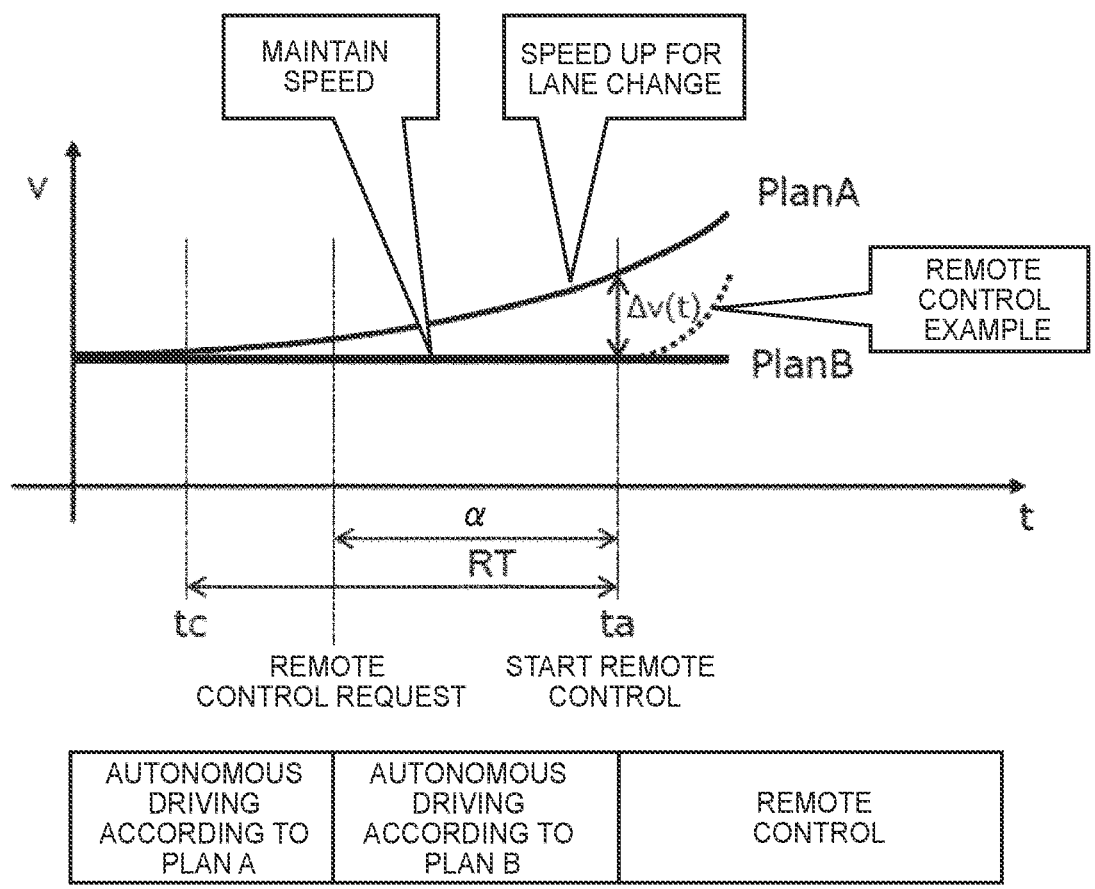
FIG. 18 shows an example of speed plans of plans A and B generated in the sixth application example of the remote support system.

When there is a predicted collision position CP where the travel trajectory TR1 and the predicted trajectory TR2 intersect in the traffic environment situation shown in FIG. 17, the autonomous driving control device 40 generates a travel trajectory TR1A based on a plan A and a travel trajectory TR1B based on a plan B. FIG. 18 shows an example of speed plans of the plans A and B generated in the sixth application example of the remote support system. The travel trajectory TR1A is a travel trajectory in which the vehicle 10 speeds up and changes into the lane L2. The travel trajectory TR1A is typically the same as the travel trajectory TR1. The travel trajectory TR1B is a travel trajectory in which the vehicle 10 maintains its speed in the lane L1.

In the sixth application example, the longer the vehicle 10 maintains its speed according to the travel trajectory TR1B, the larger the speed difference $\Delta v(t)$ from the travel trajectory TR1A. Therefore, $\Delta v(t)$ is an index for determining the limit of the timing at which the vehicle 10 is sped up to change lanes in front of the vehicle V11. The autonomous driving control device 40 performs autonomous driving of the vehicle 10 according to the travel trajectory TR1A of the plan A as long as the remaining time RT>the determination time α. When the traffic environment situation changes to a situation in which the travel trajectory TR1 and the predicted trajectory TR2 do not intersect while the remaining time RT>the determination time α, the autonomous driving control device 40 performs autonomous driving of the vehicle 10 according to the travel trajectory TR1.

When the remaining time RT<the determination time α is satisfied while the traffic environment situation in which the travel trajectory TR1 and the predicted trajectory TR2 intersect has not been eliminated, the autonomous driving control device 40 determines that it may become difficult for the vehicle 10 to safely change lanes in front of the vehicle V11. In this case, the autonomous driving control device 40 sends a remote control request and performs autonomous driving of the vehicle 10 according to the travel trajectory TR1B of the plan B. In response to the remote control request, the remote operator starts remote control before time to elapses, as in the remote control example shown in the figure. For example, the remote operator controls the vehicle 10 to speed up or slow down to the extent that does not make the occupant feel uncomfortable and to change lanes in front of the vehicle V11.

Figure 19:
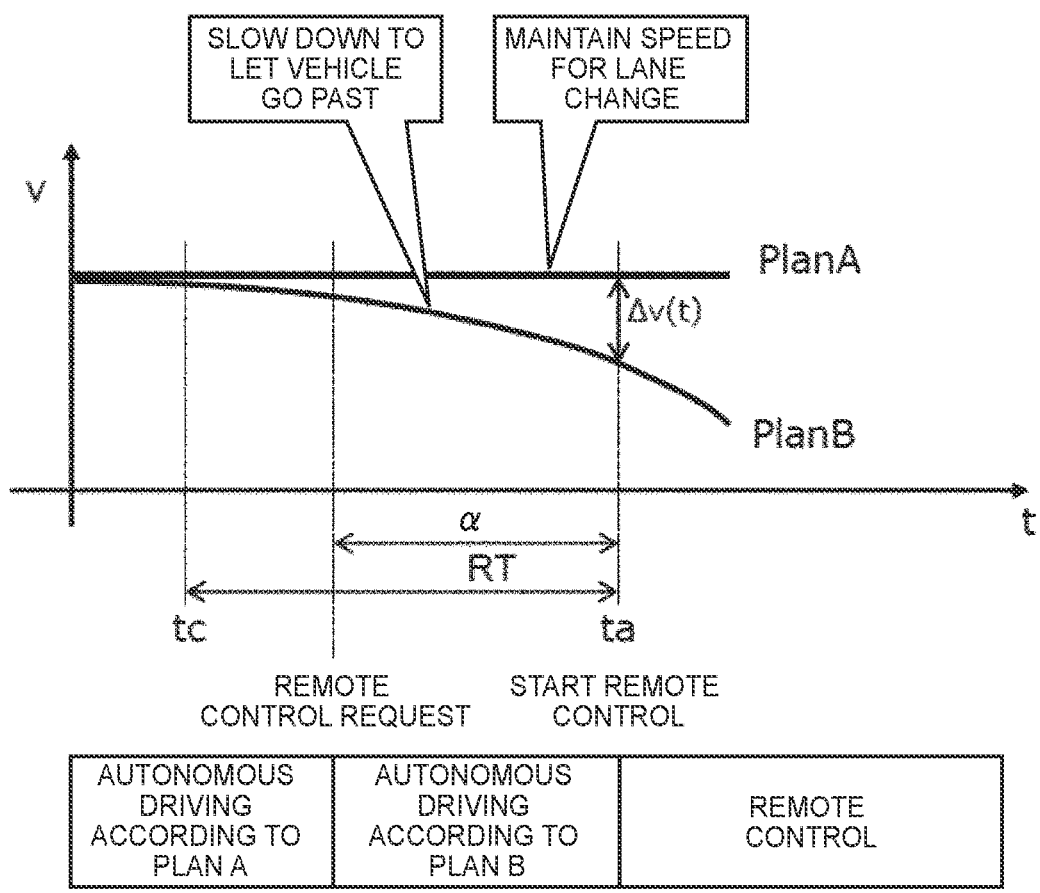
FIG. 19 shows another example of the speed plans of the plans A and B generated in the sixth application example of the remote support system.

FIG. 19 shows another example of the speed plans of the plans A and B generated in the sixth application example of the remote support system. As shown in this figure, the travel trajectory TR1A may be a travel trajectory in which the vehicle 10 maintains its current speed and changes into the lane L2. In this case, for example, the travel trajectory TR1B may be a travel trajectory in which the vehicle 10 sends a remote control request while slowing down in the lane L1 to let the vehicle V11 go past.

2-3-7. Seventh Application Example

Figure 20:
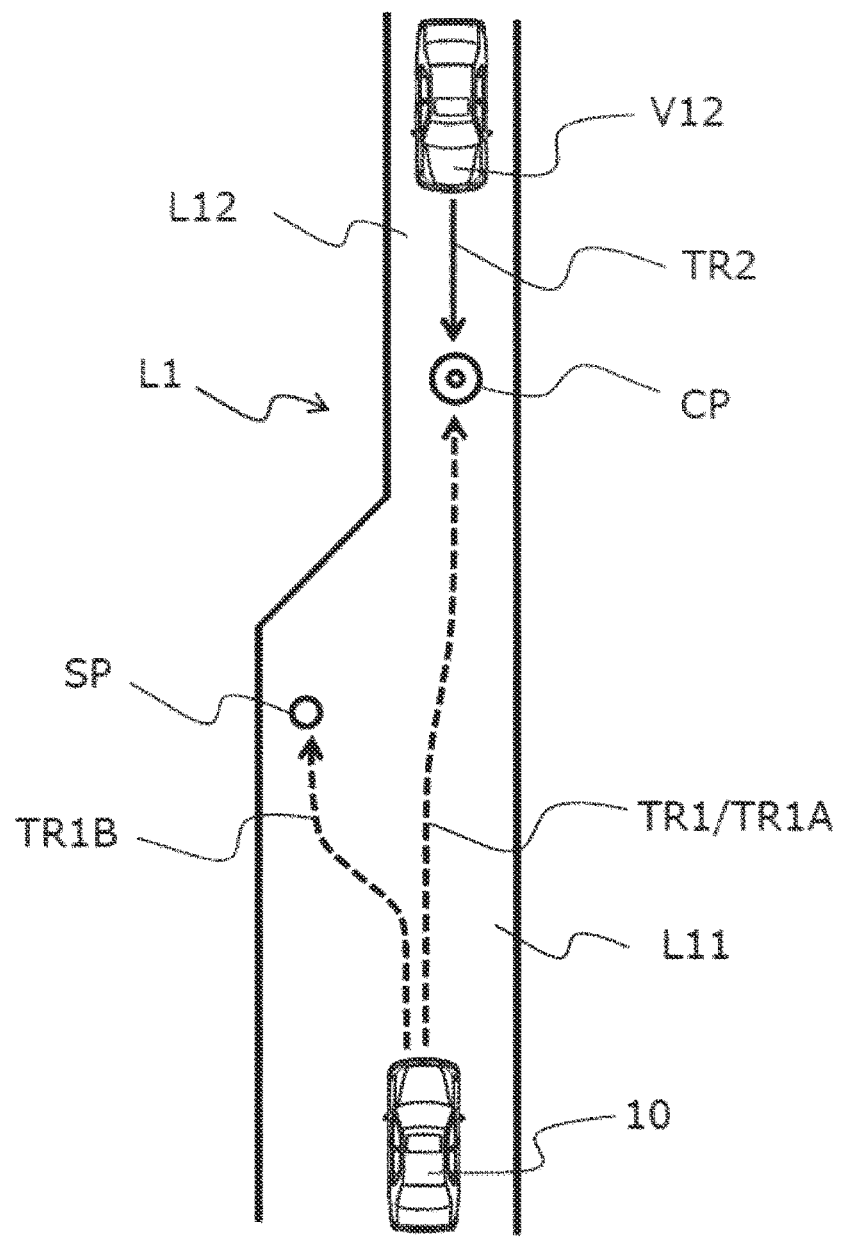
FIG. 20 shows a seventh application example of the remote support system.

FIG. 20 shows a seventh application example of the remote support system. In FIG. 20, the vehicle 10 is traveling in a lane L1. The lane L1 has a lane section L11 wide enough for two-way traffic with oncoming vehicles and a lane section L12 not wide enough for two-way traffic. The vehicle 10 in the lane L1 is traveling from the lane section L11 toward the lane section L12. There is an oncoming vehicle V12 in front of the vehicle 10, and the oncoming vehicle V12 is traveling in the lane section L12 of the lane L1 in the direction opposite to the direction of travel of the vehicle 10.

In the seventh application example, the autonomous driving control device 40 generates a travel trajectory TR1 in which the vehicle 10 travels straight from the lane section L11 into the lane section L12 and a predicted trajectory TR2 in which the vehicle V12 travels straight in the lane section L12. When the travel trajectory TR1 and the predicted trajectory TR2 do not intersect, the autonomous driving control device 40 performs autonomous driving of the vehicle 10 according to the travel trajectory TR1.

When there is a predicted collision position CP where the travel trajectory TR1 and the predicted trajectory TR2 intersect in the traffic environment situation shown in FIG. 20, the autonomous driving control device 40 generates a travel trajectory TR1A based on a plan A and a travel trajectory TR1B based on a plan B. The travel trajectory TR1A is a travel trajectory in which the vehicle 10 travels straight from the lane section L11 into the lane section L12. The travel trajectory TR1A is typically the same as the travel trajectory TR1. The travel trajectory TR1B is a travel trajectory in which the vehicle 10 moves to the left side of the lane section L11 and stops at a predetermined stop position SP before traveling from the lane section L11 into the lane section L12. Speed plans of the plans A and B generated in this example are equivalent to the speed plans in the first application example shown in FIG. 11. The subsequent processing is similar to that of the first application example.

2-3-8. Eighth Application Example

Figure 21:
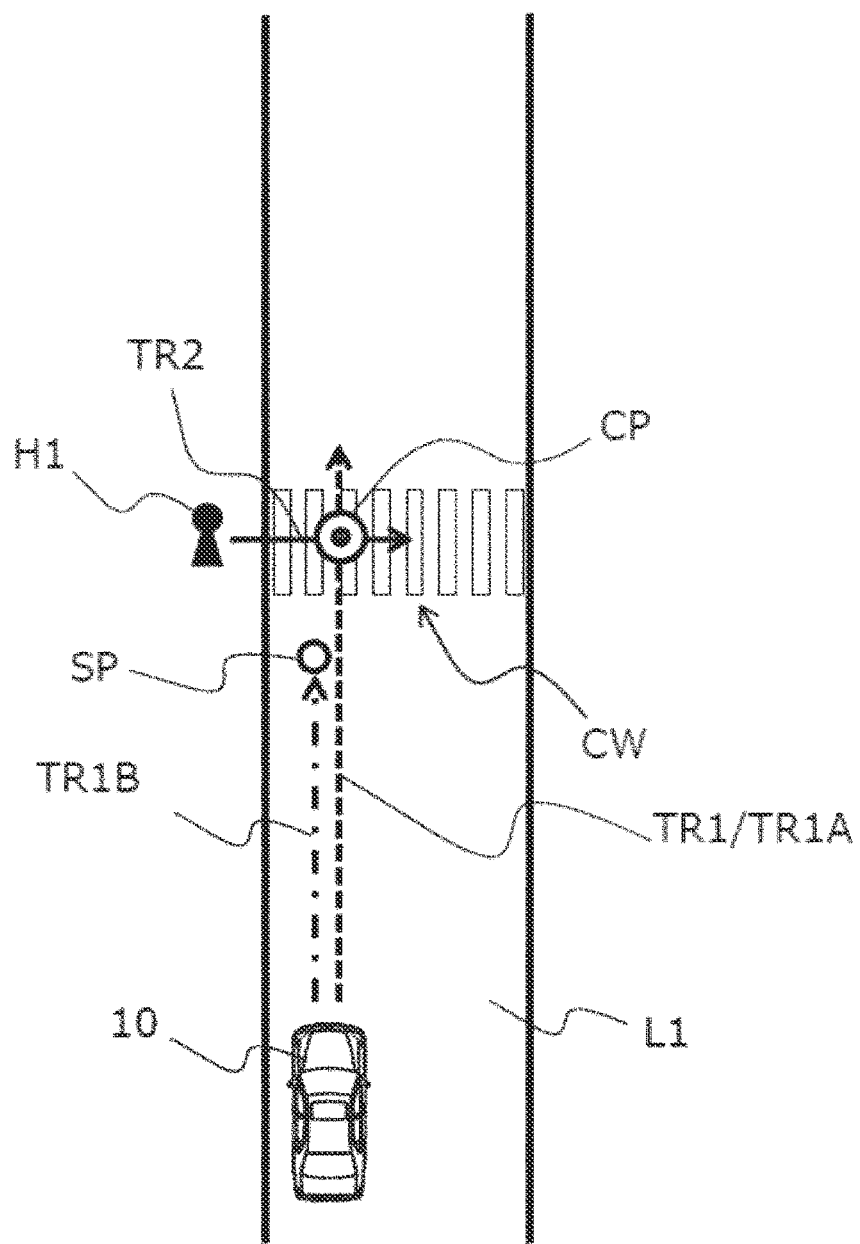
FIG. 21 shows an eighth application example of the remote support system.

FIG. 21 shows an eighth application example of the remote support system. In FIG. 21, the vehicle 10 is traveling in a lane L1. The vehicle 10 is supposed to pass a crosswalk CW. A pedestrian H1 that is an object to be avoided is predicted to cross the crosswalk CW.

In the eighth application example, the autonomous driving control device 40 generates a travel trajectory TR1 in which the vehicle 10 passes the crosswalk CW and a predicted trajectory TR2 in which the pedestrian H1 crosses the crosswalk CW. When the travel trajectory TR1 and the predicted trajectory TR2 do not intersect, the autonomous driving control device 40 performs autonomous driving of the vehicle 10 according to the travel trajectory TR1.

When there is a predicted collision position CP where the travel trajectory TR1 and the predicted trajectory TR2 intersect in the traffic environment situation shown in FIG. 21, the autonomous driving control device 40 generates a travel trajectory TR1A based on a plan A and a travel trajectory TR1B based on a plan B. The travel trajectory TR1A is a travel trajectory in which the vehicle 10 slows down and passes the crosswalk CW. The travel trajectory TR1A is typically the same as the travel trajectory TR1. The travel trajectory TR1B is a travel trajectory in which the vehicle 10 stops at a predetermined stop position SP before the crosswalk CW. Speed plans of the plans A and B generated in this example are equivalent to those of the travel plans shown in FIG. 11. The subsequent processing is similar to that of the first application example.

The eighth application example may be applied to a situation in which a vehicle traveling from a side road into the lane L1 is an object to be avoided instead of the pedestrian H1 who crosses the crosswalk CW.

2-4. Modifications

The remote support system 100 of the second embodiment may employ the following modified modes.

The index value used for determining the necessity of sending a remote control request is not limited to the speed difference $\Delta v(t)$. That is, other index values such as the speed ratio may be used as long as the degree of deviation of the speed plan of the plan A from the speed plan of the plan B can be evaluated.

As in the remote support system 100 of the first embodiment, the autonomous driving control device 40 may further determine whether the vehicle 10 will collide with an object to be avoided based on the traffic priority situation at the predicted collision position CP.

What is claimed is:

1. A remote support system configured to send a remote control request to a remote operator in response to a vehicle traveling autonomously gets into a remote control request situation, the remote support system comprising:
a storage device storing at least one program; and
at least one processor connected to the storage device, wherein:
the at least one processor is configured to perform a first determination process and a second determination process by executing the at least one program when the vehicle gets into the remote control request situation,
the first determination process includes determining whether the vehicle will collide with an object to be avoided regarding the remote control request situation,
the second determination process includes of determining necessity of sending the remote control request based on a result of the first determination process,
the first determination process includes:
acquiring map information around the vehicle, surrounding environment information regarding a surrounding environment of the vehicle, and vehicle motion information regarding motion of the vehicle, the map information including position information of roads, information on road shapes, numbers of lanes, lane widths, position information of intersections and branch points, and traffic environment information indicating a traffic environment including levels of priority of the roads, and determining whether the vehicle will collide with the object to be avoided, based on the map information, the vehicle motion information, and the surrounding environment information;

determining whether the vehicle has priority over the object to be avoided based on the levels of priority of the roads; and sending the remote control request in response to the at least one processor determining that the vehicle will collide with the object to be avoided and the vehicle does not have priority over the object to be avoided based on the levels of priority of the road; and the second determination process includes preventing sending the remote control request when the at least one processor determines that the vehicle does not collide with the object to be avoided in the first determination process; and the at least one processor is further configured to generate a travel trajectory that includes a future path that the vehicle autonomously travels, in response to one or more commands and in response to determining that the vehicle will collide with the object to be avoided regarding the remote control request situation, and controls the vehicle to autonomously travel in accordance with a desired route and includes a route plan and a first speed plan for each desired position of the route plan, wherein the remote control request situation is set in advance that includes a situation factor that is determined from the map information.

2. The remote support system according to claim 1, wherein the first determination process further includes:

generating a future predicted trajectory of the object to be avoided, based on the map information or the surrounding environment information, generating the travel trajectory of the vehicle based on the map information, the vehicle motion information, and the surrounding environment information, calculating a predicted collision position where the vehicle will collide with the object to be avoided, based on the future predicted trajectory and the travel trajectory, and determining whether the vehicle will collide with the object to be avoided, based on the map information or the surrounding environment information at the predicted collision position.

3. The remote support system according to claim 2, wherein the first determination process further includes determining that the vehicle does not collide with the object to be avoided, when the vehicle is in the traffic environment in which the vehicle has priority over the object to be avoided at the predicted collision position.

4. The remote support system according to claim 2, wherein the first determination process further includes determining that the vehicle does not collide with the object to be avoided, when the object to be avoided is a second vehicle in front of the vehicle at the predicted collision position.

5. The remote support system according to claim 2, wherein the first determination process further includes determining that the vehicle will collide with the object to be avoided, when the vehicle is in the traffic environment in which the object to be avoided has priority over the vehicle at the predicted collision position.

6. The remote support system according to claim 2, wherein the at least one processor is configured to continue autonomous driving of the vehicle based on the travel trajectory, when the at least one processor determines that the vehicle does not collide with the object to be avoided in the first determination process by executing the at least one program.

7. The remote support system according to claim 2, wherein when the at least one processor determines in the first determination process that the vehicle will collide with the object to be avoided, the second determination process further includes:

generating the first speed plan for the vehicle to continue autonomous driving at the predicted collision position, generating a second speed plan for the vehicle to stop before the vehicle reaches the predicted collision position, and determining whether to send the remote control request, based on a degree of deviation between the first speed plan and the second speed plan.

8. The remote support system according to claim 7, wherein the second determination process further includes:

calculating a remaining time until a speed difference between the first speed plan and the second speed plan becomes a predetermined threshold, and determining to send the remote control request, based on a condition that the remaining time exceeds a determination time as a determination time for the remote operator, the remaining time representing a difference between a current time and a time at which the speed difference becomes the predetermined threshold corresponding to an allowable limit.

9. The remote support system according to claim 7, wherein the at least one processor is configured to continue autonomous driving of the vehicle based on the first speed plan, when the at least one processor determines not to send the remote control request in the second determination process by executing the at least one program.

10. The remote support system according to claim 7, wherein the at least one processor is configured to continue autonomous driving of the vehicle based on the second speed plan, when the at least one processor determines to send the remote control request in the second determination process by executing the at least one program.

11. A remote support method in which a remote control request is to be sent to a remote operator in response to a vehicle traveling autonomously getting into a remote control request situation, the remote support method comprising:

in response to the vehicle getting into the remote control request situation, performing a first determination process by a processor that executes at least one program, the first determination process including determining whether the vehicle will collide with an object to be avoided regarding the remote control request situation; and in response to the vehicle getting into the remote control request situation, performing a second determination process by the processor that executes the at least one program, the second determination process including determining necessity of sending the remote control request based on a result of the first determination process, wherein:

the first determination process includes:

acquiring map information around the vehicle, surrounding environment information regarding a surrounding environment of the vehicle, and vehicle motion information regarding motion of the vehicle, the map information including position information of roads, information on road shapes, numbers of lanes, lane widths, position information of intersections, and branch points, and traffic environment information indicating a traffic environment including levels of priority of the roads, and determining whether the vehicle will collide with the object to be avoided, based on the map information, the vehicle motion information, and the surrounding environment information;

determining whether the vehicle has priority over the object to be avoided based on the levels of priority of the roads; and sending the remote control request in response to the at least one processor determining that the vehicle will collide with the object to be avoided and the vehicle does not have priority over the object to be avoided based on the levels of priority of the road; and the second determination process includes preventing sending the remote control request when the at least one processor determines that the vehicle does not collide with the object to be avoided in the first determination process;

generating a travel trajectory that includes a future path that the vehicle autonomously travels, in response to one or more commands and in response to determining that the vehicle will collide with the object to be avoided regarding the remote control request situation, and controls the vehicle to autonomously travel in accordance with a desired route and includes a route plan and a first speed plan for each desired position of the route plan, wherein the remote control request situation is set in advance that includes a situation factor that is determined from the map information.

12. The remote support method according to claim 11, wherein:

the first determination process further includes:

generating a future predicted trajectory of the object to be avoided, based on the map information or the surrounding environment information, generating the travel trajectory of the vehicle based on the map information, the vehicle motion information, and the surrounding environment information, calculating a predicted collision position where the vehicle will collide with the object to be avoided, based on the predicted trajectory and the travel trajectory, and determining whether the vehicle will collide with the object to be avoided, based on the map information or the surrounding environment information at the predicted collision position; and in response to the processor determining that the vehicle will collide with the object to be avoided in the first determination process, the second determination process further includes, by the processor:

generating the first speed plan for the vehicle to continue autonomous driving at the predicted collision position, generating a second speed plan for the vehicle to stop before the vehicle reaches the predicted collision position, and determining to send the remote control request, based on the first speed plan and the second speed plan.

* * * * *